United States Patent
Nakamura

(10) Patent No.: US 9,580,948 B2
(45) Date of Patent: Feb. 28, 2017

(54) CONNECTING SYSTEM OF MULTI-SECTION HOUSING AND ELECTRONIC DEVICE PROVIDED WITH THAT CONNECTING SYSTEM

(71) Applicant: FUJITSU LIMITED, Kawasaki-shi, Kanagawa (JP)

(72) Inventor: Yutaka Nakamura, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/887,917

(22) Filed: Oct. 20, 2015

(65) Prior Publication Data

US 2016/0040462 A1 Feb. 11, 2016

Related U.S. Application Data

(63) Continuation of application No. PCT/JP2013/062652, filed on Apr. 30, 2013.

(51) Int. Cl.
*G06F 1/16* (2006.01)
*H05K 5/00* (2006.01)
(Continued)

(52) U.S. Cl.
CPC ........... *E05D 3/022* (2013.01); *G06F 1/1641* (2013.01); *G06F 1/1649* (2013.01);
(Continued)

(58) Field of Classification Search
CPC ..... G06F 1/1641; G06F 1/1649; G06F 1/1683
(Continued)

(56) References Cited

U.S. PATENT DOCUMENTS

| | | | | |
|---|---|---|---|---|
| 6,643,124 B1 * | 11/2003 | Wilk | ...................... | G06F 1/1616 312/223.1 |
| 7,616,435 B2 * | 11/2009 | Wang | ..................... | G06F 1/1618 361/679.26 |
| 8,532,723 B2 * | 9/2013 | Ahn | ....................... | G06F 1/1616 455/566 |

(Continued)

FOREIGN PATENT DOCUMENTS

| | | |
|---|---|---|
| JP | 2009-71588 | 4/2009 |
| JP | 2009-180846 | 8/2009 |
| JP | 2009-260593 | 11/2009 |
| JP | 2010-154149 | 7/2010 |

(Continued)

OTHER PUBLICATIONS

International Search Report, mailed in connection with PCT/JP2013/062652 and mailed Jul. 16, 2013 (2 pages).

*Primary Examiner* — Anthony Haughton
(74) *Attorney, Agent, or Firm* — Fujitsu Patent Center

(57) ABSTRACT

A connecting system of a multi-section housing having first to fourth housings including housings with different thicknesses and can be spread open from the connected state to form a flat surface, comprising first hinges which connect end faces of the first and fourth housings, second hinges which connect end faces at the same sides of the second and third housings, and pull-out mechanisms provided between the first and second housings and between the third and fourth housings, which pull out the first and fourth housings from the superposed positions, and which make them adjoin the second and third housings without changing the positions in the thickness direction, the first and fourth housings being made to rotate about the shafts built into the pull-out mechanisms with respect to the second and third housings while being rotated about the first and second hinge shafts to open to form a single flat surface.

11 Claims, 25 Drawing Sheets

(51) Int. Cl.
*H05K 7/00* (2006.01)
*E05D 3/02* (2006.01)
*G09F 9/30* (2006.01)
*G09F 9/302* (2006.01)
*G09F 15/00* (2006.01)
*G06F 3/14* (2006.01)
*H04M 1/02* (2006.01)

(52) U.S. Cl.
CPC ......... *G06F 1/1683* (2013.01); *G06F 3/1446* (2013.01); *G09F 9/30* (2013.01); *G09F 9/3026* (2013.01); *G09F 15/0068* (2013.01); *H04M 1/0247* (2013.01); *E05Y 2900/606* (2013.01); *G09G 2300/026* (2013.01); *G09G 2300/0426* (2013.01); *H04M 1/0216* (2013.01); *H04M 1/0227* (2013.01); *H04M 1/0237* (2013.01)

(58) Field of Classification Search
USPC ............ 361/679.04, 679.55, 679.56, 679.21, 361/679.22, 679.23, 679.24, 679.25, 361/679.26, 679.27, 679.28, 679.29, 361/679.3
See application file for complete search history.

(56) References Cited

U.S. PATENT DOCUMENTS

| | | | | |
|---|---|---|---|---|
| 8,605,421 B2* | 12/2013 | Verschoor | ............ | G06F 1/1652 361/679.21 |
| 8,699,212 B2* | 4/2014 | Galerne | ................ | G06F 1/1656 361/679.04 |
| 8,863,038 B2* | 10/2014 | King | .................... | G06F 1/1616 345/173 |
| 8,947,320 B2* | 2/2015 | King | .................... | G06F 1/1616 345/1.1 |
| 9,030,812 B2* | 5/2015 | Nakamura | ........... | G06F 1/1624 345/1.1 |
| 2001/0003450 A1* | 6/2001 | Hemia | ................. | G06F 1/1615 345/170 |
| 2003/0050019 A1* | 3/2003 | Dowling | ............. | H04B 1/3833 455/575.1 |
| 2009/0189829 A1 | 7/2009 | Hiramatsu | | |
| 2010/0188350 A1 | 7/2010 | Sawada | | |
| 2015/0116917 A1* | 4/2015 | Aono | .................... | G06F 1/1681 361/679.04 |

FOREIGN PATENT DOCUMENTS

| | | |
|---|---|---|
| JP | 2010-266752 | 11/2010 |
| JP | 2013-25176 | 2/2013 |

* cited by examiner

CONNECTING SYSTEM OF MULTI-SECTION HOUSING AND ELECTRONIC DEVICE PROVIDED WITH THAT CONNECTING SYSTEM

CROSS-REFERENCE TO RELATED APPLICATION

This application is a continuation application based upon and claims priority of International Patent Application No. PCT/JP2013/62652, filed on Apr. 30, 2013, the contents being incorporated herein by reference.

FIELD

The present application relates to a connecting system of a multi-section housing and to an electronic device which is provided with that connecting system.

BACKGROUND

In recent years, mobile phones and other data terminals have been made smaller and thinner. Along with this, to improve the portability, operability, and ease of viewing of the display, there are products which enable the display and other moving parts to slide with respect to the keyboard and other fixed parts. FIG. 1A illustrates a data terminal 3 in a state where a moving housing (upper side housing) 2 is superposed over a fixed housing (lower side housing) 1. This data terminal 3, as illustrated in FIG. 1B, is used in a state with the movable housing 2 made to slide with respect to the fixed housing 1. As such a form of a data terminal 3, for example, there are a mobile phone, mobile terminal (tablet computer or other small computer), game machine, etc.

In this regard, in such a data terminal 3, as illustrated in FIG. 1B, when making the movable housing 2 slide with respect to the fixed housing 1, due to the structure of the housing, an overlap part L was necessary between the fixed housing 1 and the movable housing 2 in the full open state (full slide state). For this reason, the amount of slide of the movable housing 2 with respect to the fixed housing 1 was only up to two-thirds of the housing length in the slide direction. This structure was fine in the case of making the lower side fixed housing 1 the keyboard, but when also making the lower side fixed housing 1 a display part, due to the overlap part L, it was not possible to obtain a sufficient area for display.

As opposed to this, as illustrated in FIG. 1C, a data terminal 4 of a structure where the movable housing 2 becomes flat (full flat) with respect to the fixed housing 1 at the time of full slide is, for example, disclosed in Japanese Laid-Open Publication No. 2009-71588 and Japanese Laid-Open Publication No. 2010-154149. In Japanese Laid-Open Publication No. 2009-71588, there is a connecting piece which connects the side surfaces of the fixed housing (first housing) and movable housing (second housing). One of two pins at the connecting piece is supported at the movable housing, while the other is slidably engaged with the fixed housing. Further, in Japanese Laid-Open Publication No. 2010-154149, the fixed housing (second housing) and the movable housing (first housing) are connected by a link mechanism. The movable housing is fully slid with respect to the fixed housing to make the display surface fully flat.

When using a mobile terminal for e-mails or Twitter® or other applications, a small size like that of a smart phone is sufficient, but when viewing an electronic magazine or newspaper, large screen size tablets are best suited. Further, it is hard to walk around while holding both a smart phone type mobile phone and a tablet, so there is a need for using a tablet for both purposes.

However, while there have been terminals where two screens have been made single flat screens up to now, there has never been a terminal which realizes the equivalent size as a tablet by connecting a larger number of screens, for example, four screens. Further, even if it had been possible to connect four housing sections to form a large screen data terminal, as illustrated in FIG. 1D, there was the issue of a step difference forming at the screens of the housing sections 5A to 5D divided into four so as to form a data terminal 5. Further, if a step difference arises, the screen becomes harder to view or a touch operation (wipe operation) ends up being obstructed. Furthermore, if the sizes of the four housing sections forming the four screens are matched with the thickest one, there is the problem that the thickness of the electronic device which is formed by superposing these increases and the apparatus becomes large in size.

SUMMARY

In one aspect, the present application provides a connecting system of a multi-section housing in an electronic device where a large number of housing sections are connected to form a single screen, wherein even if the thicknesses of the housing sections are made suitable thicknesses for the function of the housing, it is possible to make the screen flat when these are spread open. Further, it provides an electronic device which is provided with a connecting system of a multi-section housing where when connecting four superposed housing sections with different thicknesses, the screen of the connected housing sections becomes fully flat.

According to one aspect of the present application, there is provided a connecting system of a multi-section housing which is comprised of first to fourth four housing sections of rectangular shapes in a plan view which are superposed in that order, the thickness of at least one housing section being different from the thicknesses of the other housing sections, the connecting system of a multi-section housing comprising first hinges which connect single end faces of the first and fourth housing sections and which enable end faces of the first and fourth housing sections at the non-connected sides to be opened about hinge shafts, second hinges which connect end faces of the second and third housing sections at the same sides as the first hinges and which enable end faces of the second and third housing sections at the non-connected sides to be opened about hinge shafts, pull-out mechanisms which are arranged between the first and second housing sections and between the third and fourth housing sections and which pull out the first and fourth housing sections which are connected by the first hinges from the superposed positions so that they are arranged at the sides of the second and third housing sections while remaining the same in position in the thickness direction, and shafts which are built into the respective pull-out mechanisms, which enable the second housing section to be rotated 180 degrees with respect to the first housing section and the fourth housing section to be rotated 180 degrees with respect to the third housing section, and which make the positions of the first housing section and second housing section and the third housing section and the fourth housing section in the thickness direction the same, the pull-out mechanisms enabling the first and fourth housing sections to be arranged adjoining the second and third housing sections without the positions in the thickness direction changing, and, in the state after arrangement adjoining each other, the first and second hinges enabling the second and third housing section and the first and fourth housing section to be rotated about the shafts while opening them to form a single flat surface.

Further, according to another aspect of the present application, there is provided an electronic device which is provided with a multi-section housing which is comprised of first to fourth four housing sections which are superposed in that order and which are connected by a connecting system, the thickness of at least one housing section being different from the thicknesses of the other housing sections, the connecting system comprising first hinges which connect single end faces of the first and fourth housing sections and which enable end faces of the first and fourth housing sections at the non-connected sides to be opened about hinge shafts, second hinges which connect end faces of the second and third housing sections at the same sides as the first hinges and which enable end faces of the second and third housing sections at the non-connected sides to be opened about hinge shafts, pull-out mechanisms which are arranged between the first and second housing sections and between the third and fourth housing sections and which pull out the first and fourth housing sections which are connected by the first hinges from the superposed positions so that they are arranged at the sides of the second and third housing sections while remaining the same in position in the thickness direction, and shafts which are built into the respective pull-out mechanisms, which enable the second housing section to be rotated 180 degrees with respect to the first housing section and the fourth housing section to be rotated 180 degrees with respect to the third housing section, and which make the positions of the first housing section and second housing section and the third housing section and the fourth housing section in the thickness direction the same, the pull-out mechanisms enabling the first and fourth housing sections to be arranged adjoining the second and third housing sections without the positions in the thickness direction changing, in the state after arrangement adjoining each other, the first and second hinges enabling the second and third housing section and the first and fourth housing section to be rotated about the shafts while opening them to form a single flat surface, wherein the electronic device comprises a control device which is provided in any one of the first to fourth housing sections and which displays an image of one-quarter of a screen's worth of a single display image synchronized with other images, and when the connecting system of a multi-section housing is used to make the first to fourth housing sections form a single flat surface, the control device is used to make adjoining display screens display a single image as a whole.

DESCRIPTION OF EMBODIMENTS

Below, using the attached drawings, embodiments of a connecting system of a multi-section housing and an electronic device which is provided with that connecting system according to the present application will be explained in detail based on detailed examples.

Figure 1A:
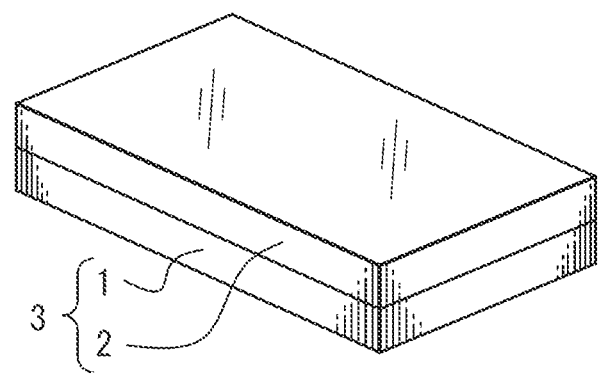
FIG. 1A is a perspective view which illustrates a closed state of a slide type data terminal of the related art.
Figure 1B:
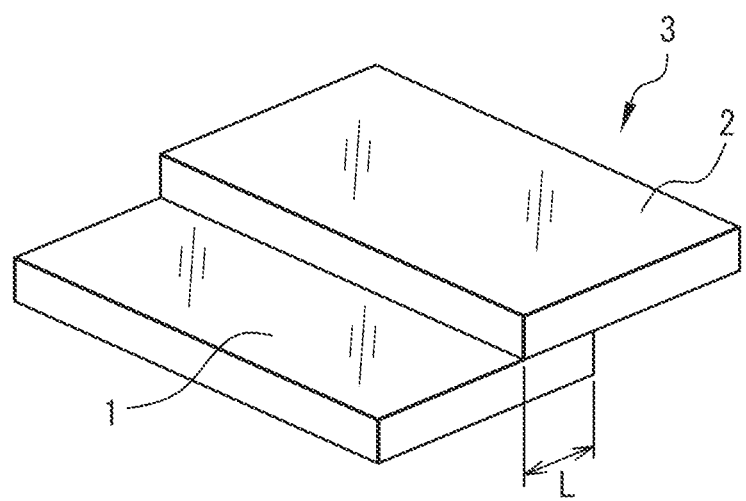
FIG. 1B is a perspective view which illustrates a slide out state of the data terminal which is illustrated in FIG. 1A.
Figure 1C:
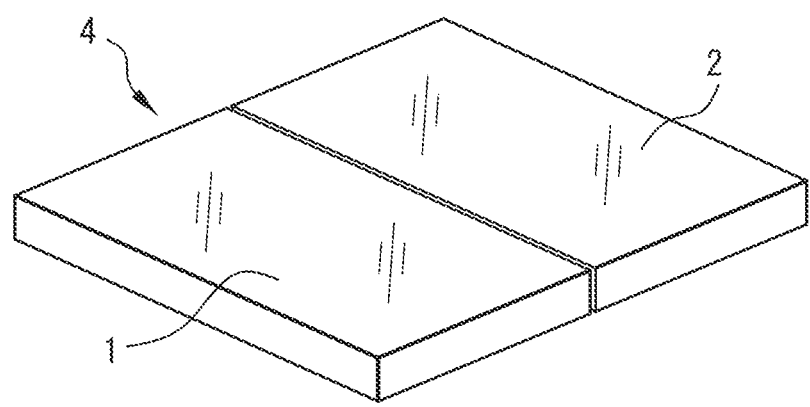
FIG. 1C is a perspective view which illustrates a state where the data terminal which is illustrated in FIG. 1B is further slid out to render the screen a full flat state.
Figure 1D:
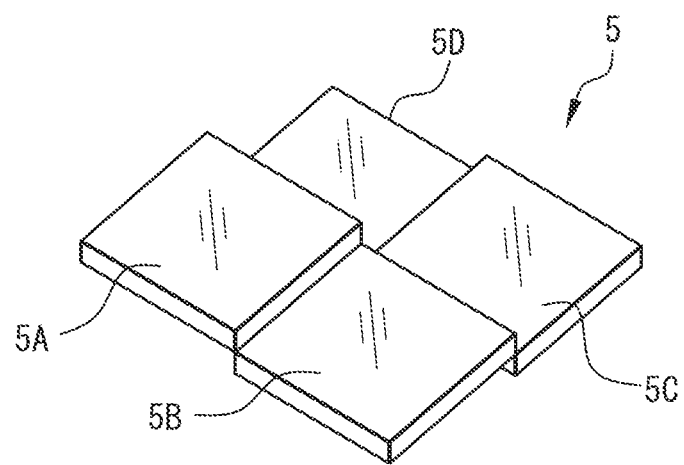
FIG. 1D is a perspective view which illustrates a data terminal of the related art which is provided with a connected screen obtained by connecting four housing sections.
Figure 2A:
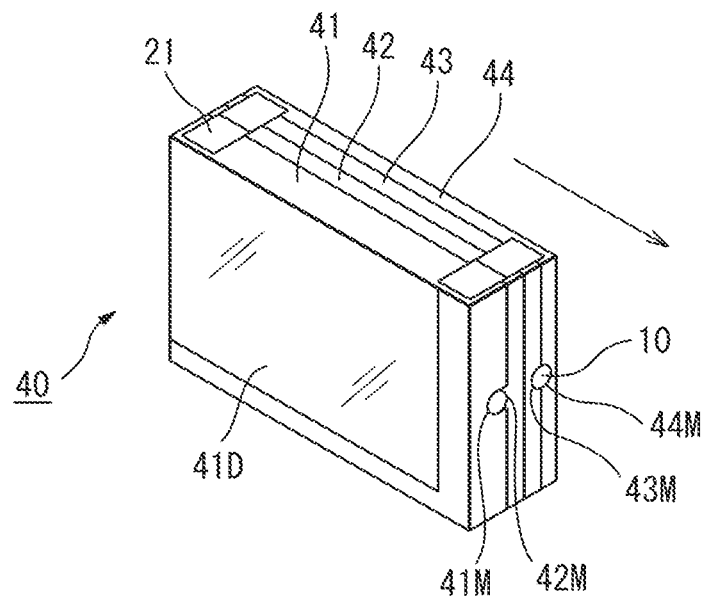
FIG. 2A is a perspective view which illustrates a closed state of an electronic device of a first embodiment which is provided with a multi-section housing of an uneven thickness which is connected by first connecting devices and second connecting devices of the first aspect.
Figure 2B:
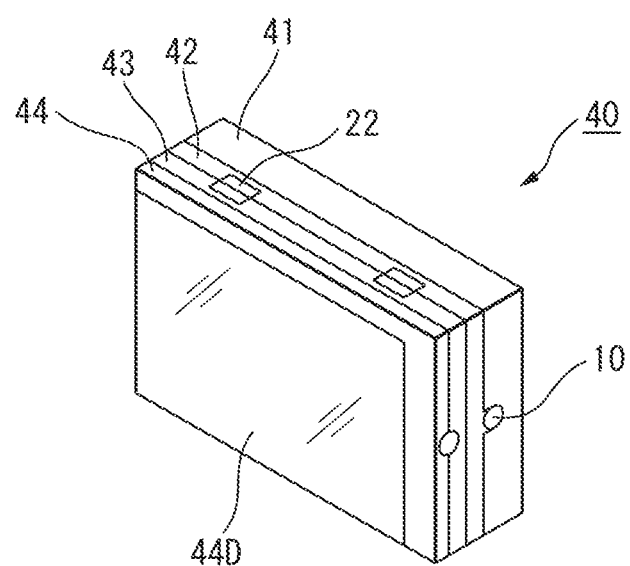
FIG. 2B is a perspective view of the electronic device which is illustrated in FIG. 2A as seen from a bottom side.

FIG. 2A illustrates the closed state of the electronic device 40 of the first embodiment which is formed by the four housing sections 41 to 44 stacked together in that order wherein the thickness of the first housing section 41 differs from the other second to fourth housing sections 42 to 44. Further, FIG. 2B is a perspective view of the electronic device 40 which is illustrated in FIG. 2A as seen from the bottom side. The first to fourth housing sections 41 to 44 respectively have screens (displays) 41D to 44D. The displays 41D and 44D are exposed, but the displays 42D, 43D face each in state and are hidden.

As will be understood from FIGS. 2A and 2B, the electronic device 40 has the first connecting devices 10 of the first aspect built into them. At one side surface in the longitudinal direction, second connecting devices which are provided with first hinges 21 and second hinges 22 are provided. The first hinges 21 bridge the first housing section 41 and fourth housing section 44. The first housing section 41 and fourth housing section 44 can be opened about the shafts of the first hinges 21 in a V-shape. Similarly, the second hinges 22 bridge the second housing section 42 and third housing section 43. The second housing section 42 and third housing section 43 can be opened about the shafts of the second hinges 22 in a V-shape.

Figure 2C:
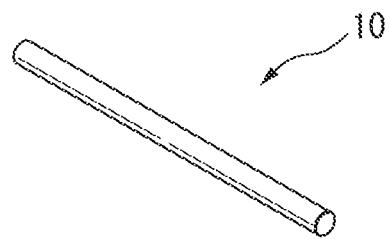
FIG. 2C is a perspective view which illustrates a first connecting device of the first aspect of the present application.

FIG. 2C illustrates a first connecting device 10 of the first aspect of the present application. The first connecting device 10 is a shaft which is provided with the same total length as the first to fourth housing sections 41 to 44 and is provided between grooves 41M, 42M which are provided at the superposed surfaces of the first and second housing sections 41, 42 and between the grooves 43M, 44M which are provided at the superposed surfaces of the third and fourth housing sections 43, 44. The first connecting device 10 is actually formed in a tubular shape so as to enable sliding and rotation with respect to the grooves 41M, 42M and grooves 43M, 44M. A slit is provided in the longitudinal direction and a slit is provided in the circumferential direction. A sliding assist member which is inserted in the slits performs the slide-and-rotate operation. However, here, the first connecting device 10 is drawn as a columnar shaped member which can slide and rotate with respect to the grooves 41M, 42M and grooves 43M, 44M.

Figure 2D:
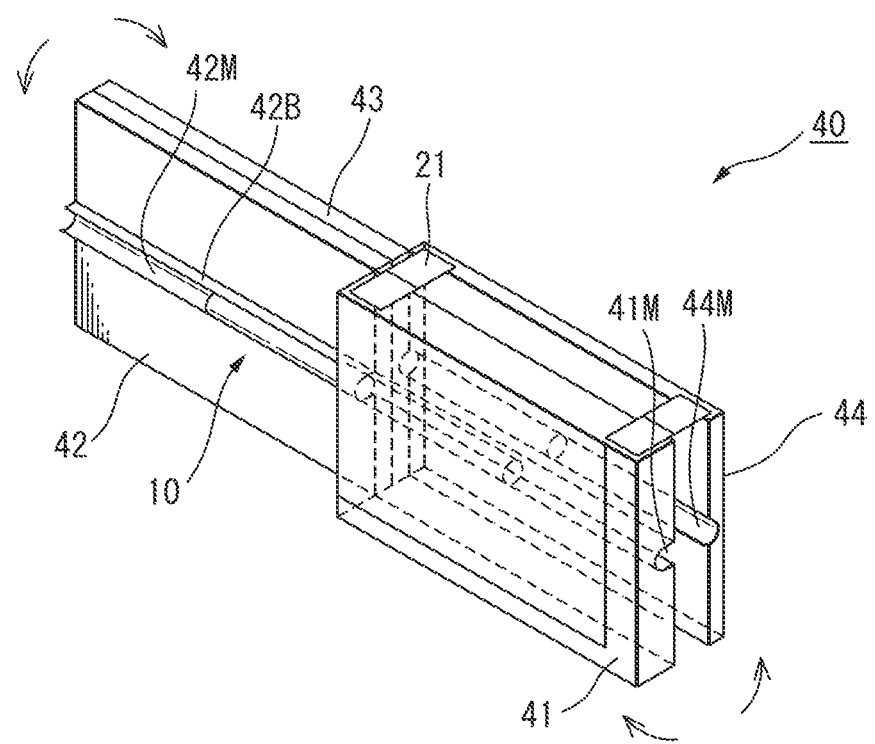
FIG. 2D is a perspective view which illustrates the slid state where the outside two housing sections in the four housing sections of the electronic device which are illustrated in FIG. 2A are made to slide with respect to the inside two housing sections.

FIG. 2D illustrates the state where the outside first and fourth housing sections 41, 44 in the four housing sections 41 to 44 which are illustrated in FIG. 2A are made to fully slide with respect to the inside second and third housing sections 42, 43. In the full slide state, the end parts of the first and fourth housing sections 41, 44 of the second and third housing section 42, 43 sides and the end parts of the second and third housing sections 42, 43 at the first and fourth housing section 41, 44 sides are not superposed. Further, the lengths of the first connecting devices 10 which stick out from the first and fourth housing sections 41, 44 to the second and third housing section 42, 43 sides and the lengths of the first connecting devices 10 which stick out from the second and third housing sections 42, 43 to the first and fourth housing section 41, 44 sides are the same. Further, the grooves 43M, 44M are the same thicknesses as the third and fourth housing sections 43, 44, so can be formed to the same shapes of semicircular grooves. On the other hand, regarding the grooves 41M, 42M, the thickness of the first housing section 41 is greater than the thickness of the second housing section 42, so the groove 41M which is provided at the first housing section 41 is deep. The groove 42M which is provided at the second housing section 42 is not provided with the bank part 42B.

From this state, the end parts of the first and fourth housing sections 41, 44 with no hinges 21 and the end parts of the second and third housing sections 42, 43 with no hinges 22 are spread apart in the arrow directions. This being so, the first and fourth housing sections 41, 44 and the second and third housing sections 42, 43 rotate about the first connecting devices 10 and open about the hinges 21, 22 in a V-shape. If the first and fourth housing sections 41, 44 and second and third housing sections 42, 43 are further spread apart, the first and fourth housing sections 41, 44 and the second and third housing sections 42, 43 are rotated about the first connecting devices 10 by 180 degrees, whereupon the entire surface becomes fully flat such as illustrated in FIG. 2E.

Figure 2E:
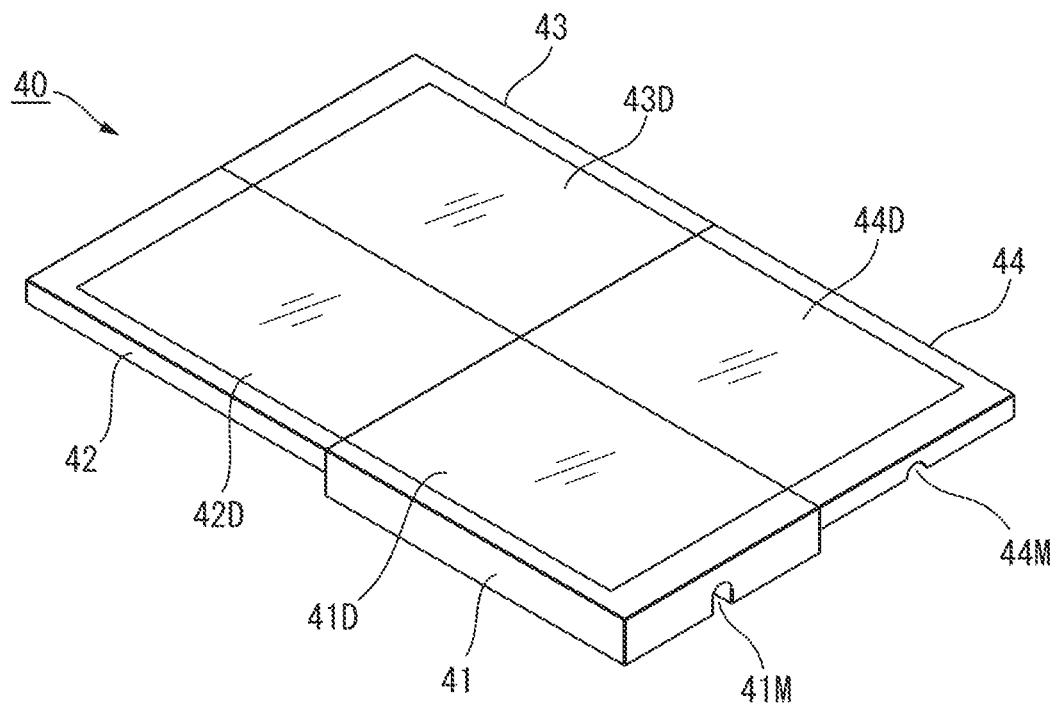
FIG. 2E is a perspective view which illustrates the state where the outside two housing sections and the inside two housing sections are opened in the arrow directions and are rotated 180 degrees about the first connecting devices and about the shafts of the hinges of the second connecting devices to form a flat surface from the state which is illustrated in FIG. 2D.
Figure 3A:
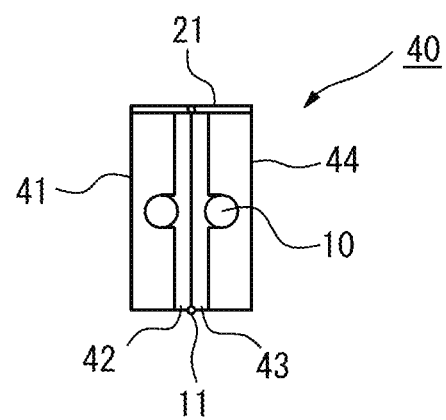
FIG. 3A is a front view of the electronic device which is illustrated in FIG. 2D as seen from a front view.
Figure 3B:
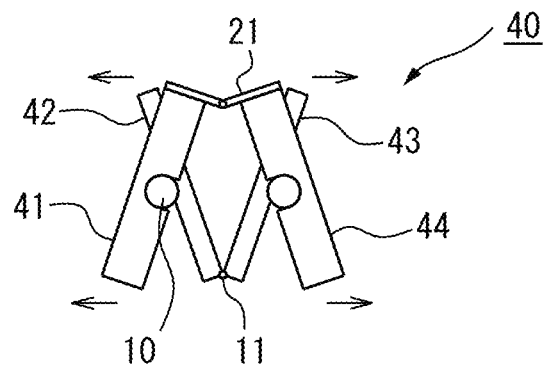
FIG. 3B is a front view which illustrates the state where the outside two housing sections and the inside two housing sections are opened in the arrow directions and started to be rotated about the first connecting devices and the shafts of the hinges from the state which is illustrated in FIG. 2D.
Figure 3C:
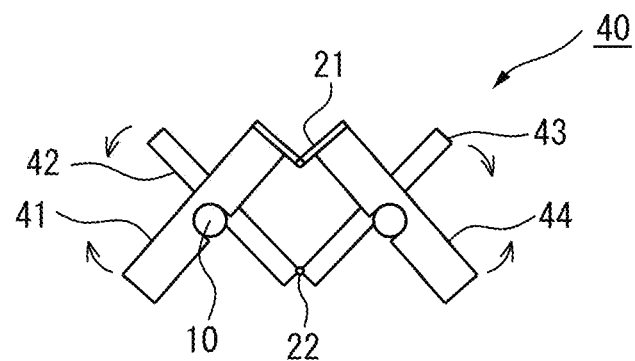
FIG. 3C is a front view which illustrates the state where the outside two housing sections and the inside two housing sections are respectively further rotated about the first connecting devices and the shafts of the hinges from the state which is illustrated in FIG. 3B.
Figure 3D:
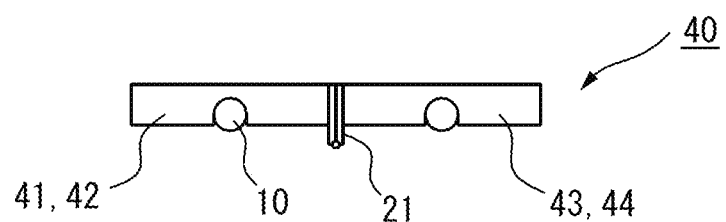
FIG. 3D is a front view which illustrates the state where the outside two housing sections and the inside two housing sections are respectively further rotated about the first connecting devices and the shafts of the hinges from the state which is illustrated in FIG. 3C.

Views of the operation of the electronic device 40 from the state of FIG. 2D to the state which is illustrated in FIG. 2E as seen from the longitudinal direction of the electronic device 40 are given from FIG. 3A to FIG. 3D. FIG. 3A is a view of the state which is illustrated in FIG. 2D as seen from the longitudinal direction of the electronic device 40, while FIG. 3B illustrates the state where the first and fourth housing sections 41, 44 and the second and third housing sections 42, 43 are spread open slightly from the state which is illustrated in FIG. 3A. It will be learned that if spreading open the first and fourth housing sections 41, 44 and second and third housing sections 42, 43, the first to fourth housing sections 41 to 44 all rotate about the first connecting devices 10. Further, FIG. 3C illustrates the state where the first and fourth housing sections 41, 44 and second and third housing sections 42, 43 are further spread open from the state which is illustrated in FIG. 3B. FIG. 3D illustrates a view of the state which is illustrated in FIG. 2E as seen from the longitudinal direction of the electronic device 40. From FIG. 3D, it will be understood that the surfaces of the first to fourth housing sections 41 to 44 where the displays 41D to 44D are provided after the end of rotation become fully flat.

Figure 4A:
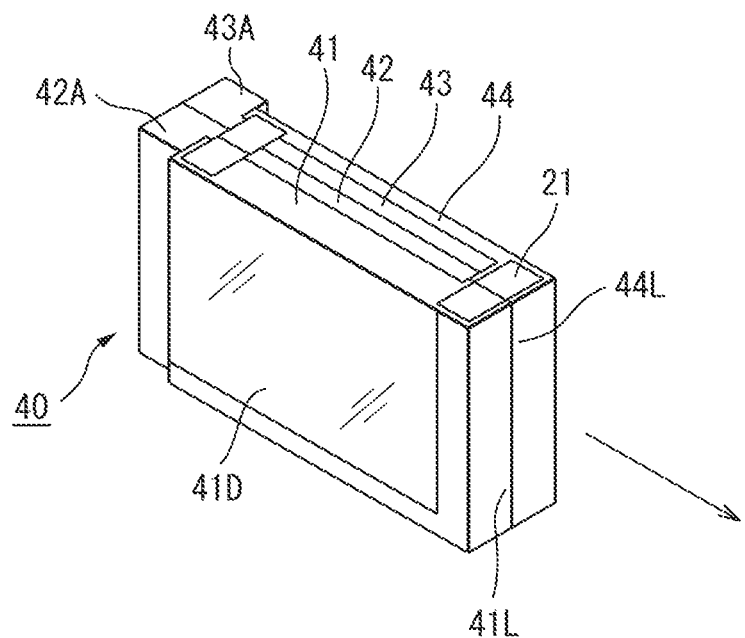
FIG. 4A is a perspective view which illustrates the closed state of the electronic device of the second embodiment which is provided with a multi-section housing of uneven thickness which is connected by the first connecting devices and second connecting devices of the second aspect.
Figure 4B:
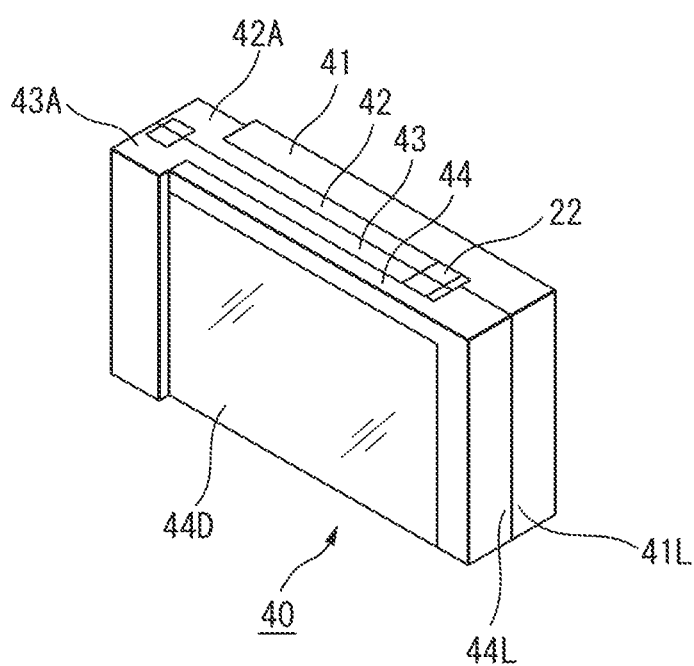
FIG. 4B is a perspective view of the electronic device which is illustrated in FIG. 4A as seen from the bottom side.

FIG. 4A illustrates the closed state of the electronic device 40 of the second embodiment which is formed from the four housing sections 41 to 44 stacked in that order in the case where the thickness of the first housing section 41 is greater than the other second to fourth housing sections 42 to 44. Further, FIG. 4B is a perspective view of the electronic device 40 which is illustrated in FIG. 4A as seen from the bottom side. The first to fourth housing sections 41 to 44 respectively have screens (display) 41D to 44D. The displays 41D, 44D are exposed, but the displays 42D, 43D face each other and are hidden.

While not illustrated in FIGS. 4A and 4B, the electronic device 40 is provided with the first connecting devices 10 of the second aspect built in. One side surface in the longitudinal direction is provided with second connecting devices provided with first hinges 21 and second hinges 22. The first hinges 21 bridge the first housing sections 41 and fourth housing sections 44. The first housing section 41 and fourth housing section 44 can open about the shafts of the first hinges 21 in V-shapes. Similarly, the second hinges 22 bridge the second housing section 42 and third housing section 43. The second housing section 42 and third housing section 43 can open about the shafts of the second hinges 22 in V-shapes.

Figure 4C:
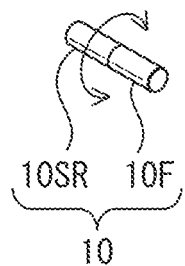
FIG. 4C is a perspective view which illustrates the first connecting device of the second aspect of the present application.

As illustrated in FIG. 4A, among the first to fourth housing sections 41 to 44, the adjoining first and second housing sections 41, 42 form a pair, while the similarly adjoining third and fourth housing sections 43, 44 form a pair. The first connecting devices of the second aspect are provided between the paired first and second housing sections 41, 42 and between the paired third and fourth housing sections 43, 44. The first connecting devices 10 of the second aspect, as illustrated in FIG. 4C, have parts 10SR which project out from one of the housing sections (first and fourth housing sections 41, 44) to the other housing sections (second and third housing sections 42, 43) when two housing sections are superposed. For this reason, the second and third housing sections 42, 43 are provided with holding parts 42A, 43A for holding the projecting parts.

Figure 4D:
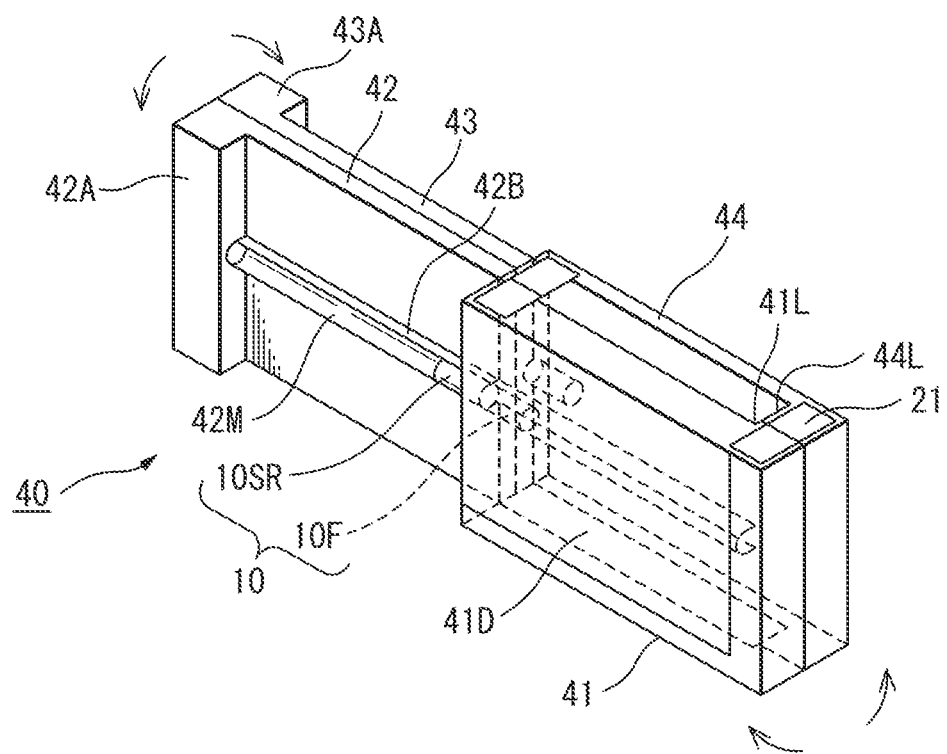
FIG. 4D is a perspective view which illustrates the full slide state where the outside two housing sections among the four housing sections of the electronic device which is illustrated in FIG. 4A are made to slide with respect to the inside two housing sections.
Figure 4E:
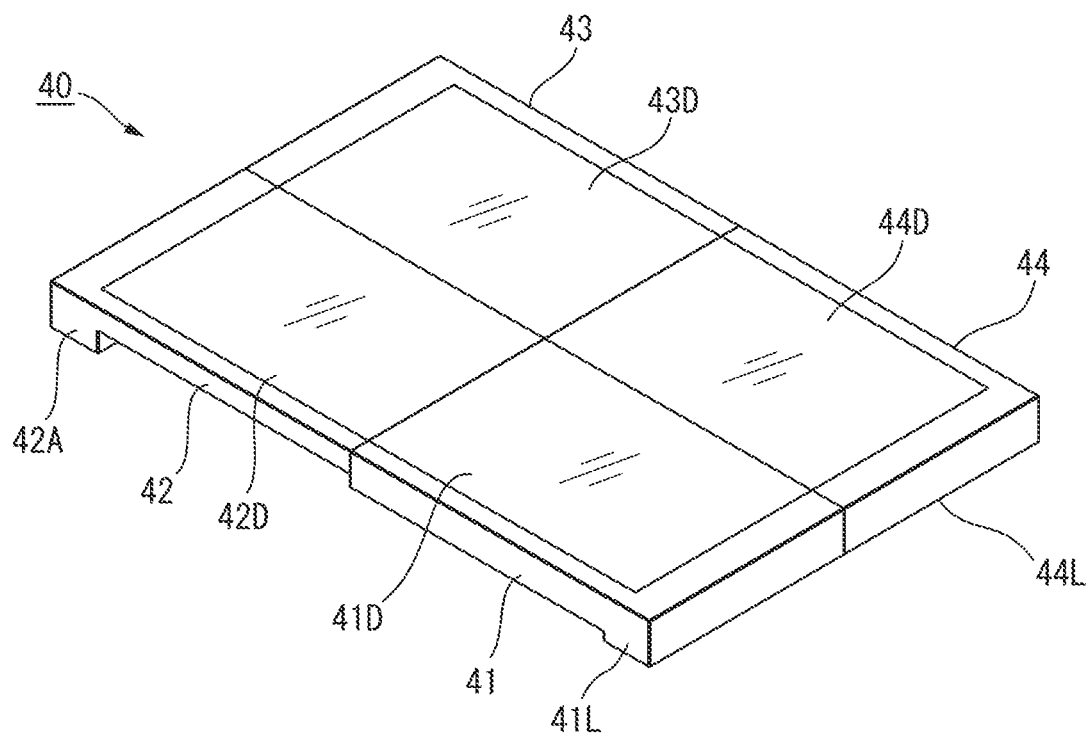
FIG. 4E is a perspective view which illustrates the state where the outside two housing sections and the inside two housing sections are opened in the arrow directions and started to be rotated about the first connecting devices and the shafts of the hinges of the second connecting devices from the state which is illustrated in FIG. 4D.

The holding parts 42A, 43A stick out at the opposite side surfaces of the displays 42D, 43D when opening the first to fourth four housing sections 41 to 44 as illustrated in FIG. 4E. For this reason, in the electronic device 40 of the second embodiment, the first and fourth housing sections 41, 44 are provided with leg parts 41L, 44L so as to stick out at the opposite side surfaces of the displays 41D, 44D. The leg parts 41L, 44L have projecting heights the same as the holding parts 42A, 43A if the first and fourth housing sections 41, 44 are the same thickness, but in the second embodiment, the thickness of the housing section 41 is greater, so the height of the leg part 41L which is provided at the first housing section 41 is low. That is, the placement surfaces of the holding parts 42A, 43A and the leg parts 41L, 44L are the same in height from the displays 41D to 44D, so the single large screen which is formed when opening the first to fourth four housing sections 41 to 44 becomes parallel to the placement surface of the electronic device 40.

The first connecting device 10 of the second aspect, as illustrated in FIG. 4C, is shorter in length compared with the lengths of the housing sections 41 to 44 in the longitudinal direction. The first and fourth housing section sides become the fixed parts 10F while the second and third housing section sides become the slide-and-rotate parts 10SR. The fixed parts 10F are fixed to the first and fourth housing sections 41, 44, while the slide-and-rotate parts 10SR are made able to rotate with respect to the fixed parts 10F by 180 degrees.

FIG. 4D illustrates the full slide state where the outside first and fourth housing sections 41, 44 in the four housing sections 41 to 44 which are illustrated in FIG. 4A are made to slide with respect to the inside second and third housing sections 42, 43 in the directions illustrated by the arrows. In the slid state, the slide-and-rotate parts 10SR of the first connecting devices 10 are pulled out from the holding parts 42A, 43A which are provided at the second and third housing sections 42, 43 and slid in the grooves 42M, 43M which are provided at the second and third housing sections 42, 43. In the full slide state, the first and fourth housing sections 41, 44 are not superposed with the second and third housing sections 42, 43.

In the state which is illustrated in FIG. 4D, the end parts of the first and fourth housing section 41, 44 with no hinges 21 and the end parts of the second and third housing sections 42, 43 with no hinges 22 are spread open in the arrow directions. This being so, the first and fourth housing sections 41, 44 and the second and third housing sections 42, 43 are rotated about the first connecting devices 10 and are opened in a V-shape about the hinges 21, 22. If further spreading open the first and fourth housing sections 41, 44 and the second and third housing sections 42, 43, the first and fourth housing sections 41, 44 and the second and third housing sections 42, 43 are rotated 180 degrees about the first connecting devices 10, whereupon they become the full flat state which is illustrated in FIG. 4E. In the full flat state, the displays 41D to 44D at all of the housing sections 41 to 44 adjoin each other and become a single screen.

Figure 5A:
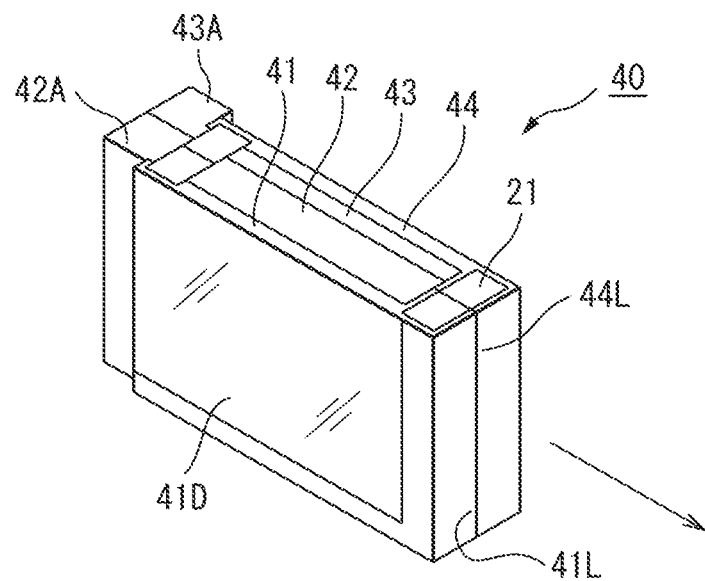
FIG. 5A is a perspective view which illustrates the closed state of the electronic device of the third embodiment which is provided with the multi-section housing of uneven thickness which is connected by the first connecting devices and second connecting devices of the second aspect.

FIG. 5A illustrates the closed state of an electronic device 40 of a third embodiment which is formed by four housing sections 41 to 44 which are superposed in that order wherein the thickness of the second housing section 42 differs from the other first and third and fourth housing sections 41, 43, 44. The point where the electronic device 40 of the third embodiment differs from the electronic device 40 of the second embodiment is only the positions of the housing section with the different thickness. For the first connecting devices 10, first connecting devices 10 of the second aspect the same as the second embodiment are used. Further, the attachment positions of the first hinges 21 and the second hinges 22 which are included in the second connecting devices are also the same as in the second embodiment. The positions of the displays 41D to 44D which are provided at the first to fourth housing sections 41 to 44 are also the same.

In the electronic device 40 of the third embodiment, the thickness of the second housing section 42 is greater compared to the other housing sections 41, 43, and 44, so the height of the holding part 42A becomes lower than the holding part 43A. Therefore, while not illustrated, the groove of the first housing section 41 is also provided with the bank part. Further, the thicknesses of the first and fourth housing sections 41, 44 are the same, so the heights of the leg parts 41L, 44L are made the same. In the third embodiment, just the thickness of the second housing section 42 is greater, but the placement surfaces of the holding parts 42A, 43A and leg parts 41L, 44L are formed to the same heights from the displays 41D to 44D.

Figure 5B:
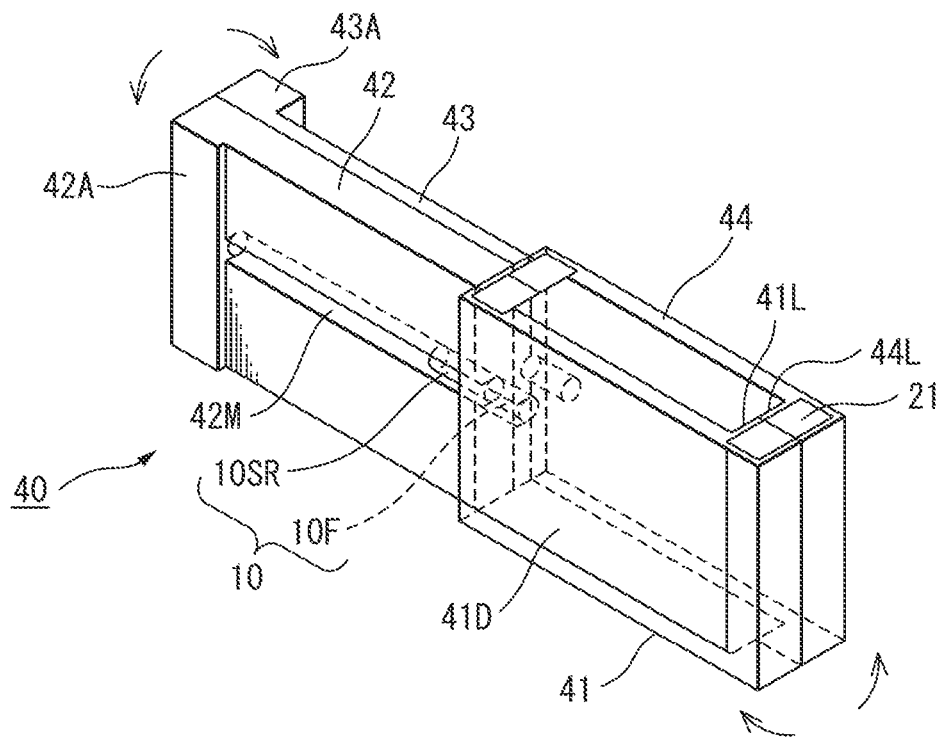
FIG. 5B is a perspective view which illustrates the full slide state where the outside two housing sections among the four housing sections of the electronic device which is illustrated in FIG. 5A are made to slide with respect to the inside two housing sections.
Figure 5C:
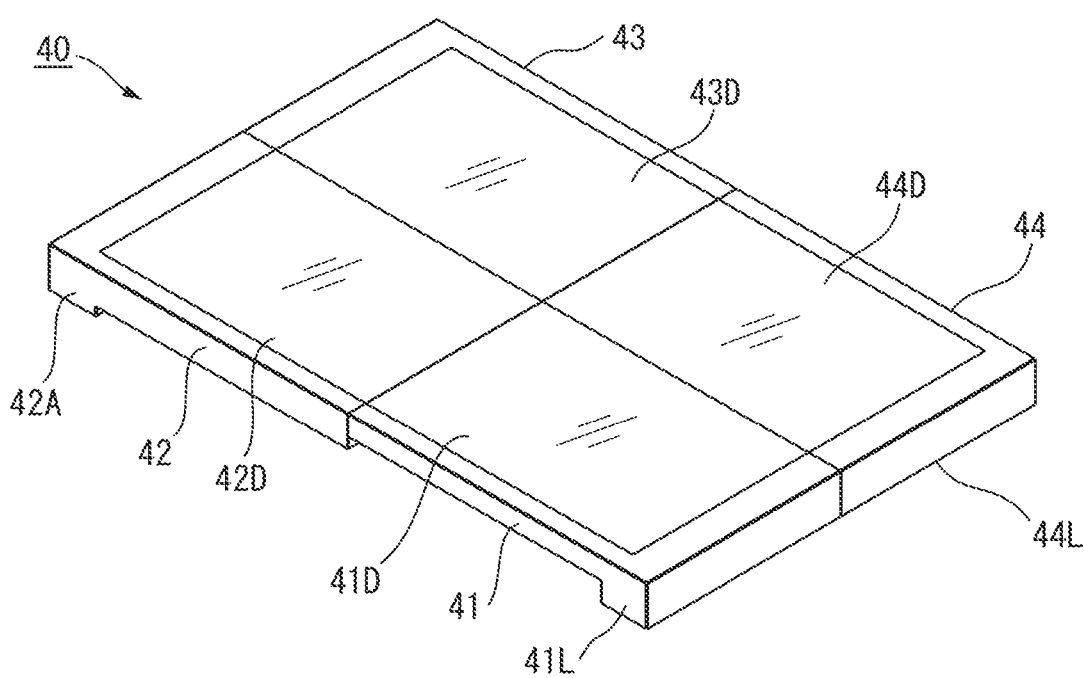
FIG. 5C is a perspective view which illustrates the state where the outside two housing sections and the inside two housing sections are opened in the arrow directions and started to be rotated about the first connecting devices and the shafts of the hinges of the second connecting devices by 180 degrees whereby a flat surface is formed from the state which is illustrated in FIG. 5B.

Therefore, even in the electronic device 40 of the third embodiment, if opening the first to fourth housing sections 41 to 44 from the closed state, first, the first and fourth housing sections 41, 44 are made to slide with respect to the second and third housing sections 42, 43 in the direction illustrated by the arrow in FIG. 5A to obtain the state which is illustrated FIG. 5B. Further, in the state of FIG. 5B, the end parts of the first and fourth housing sections 41, 44 and the end parts of the second and third housing sections 42, 43 are spread apart in the arrow directions. This being so, when the first and fourth housing sections 41, 44 and second and third housing sections 42, 43 rotate about the first connecting devices 10 by 180 degrees, the full flat state such as illustrated in FIG. 5C is obtained. In the full flat state, the displays 41D to 44D at all of the housing sections 41 to 44 adjoin each other to form a single screen. In this way, even if the thickness of the second housing section 42 is greater than the other housing sections 41, 43, and 44, it is possible to make the displays 41D to 44D at all of the housing sections 41 to 44 adjoin each other to form a single screen.

Figure 6A:
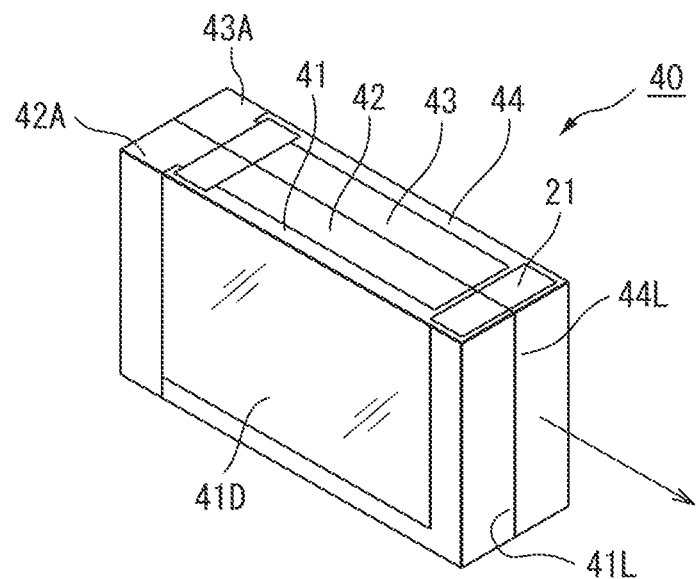
FIG. 6A is a perspective view which illustrates the closed state of the electronic device of the fourth embodiment which is provided with the multi-section housing of uneven thickness which is connected by the first connecting devices and second connecting devices of the second aspect.

FIG. 6A illustrates the closed state of the electronic device 40 of the fourth embodiment which is formed from the four housing sections 41 to 44 stacked in that order in the case where the thicknesses of the second and third housing sections 42, 43 differ from the first and fourth housing sections 41, 44. The point where the electronic device 40 of the fourth embodiment differs from the electronic device 40 of the third embodiment is that there are two housing sections of different thicknesses. For the first connecting devices 10, first connecting devices 10 of the second aspect the same as in the third embodiment are used. Further, the attachment positions of the first hinges 21 and second hinges 22 which are contained in the second connecting devices are the same as in the second embodiment. The positions of the displays 41D to 44D which are provided at the first to fourth housing sections 41 to 44 are also the same.

In the electronic device 40 of the fourth embodiment, the thicknesses of the second and third housing sections 42, 43 are greater than the first and fourth housing sections 41, 44, so the heights of the holding parts 42A, 43A become lower compared with the heights of the leg parts 41L, 44L. Therefore, while not illustrated, the grooves of the first and fourth housing sections 41, 44 are also provided with bank parts. Further, the thicknesses of the first and fourth housing sections 41, 44 are the same, so the heights of the leg parts 41L, 44L are formed the same. In the fourth embodiment, the thicknesses of the second and third housing sections 42, 43 are greater than the first and fourth housing sections 41, 44, but the placement surfaces of the holding parts 42A, 43A and leg parts 41L, 44L are formed to be the same in heights from the displays 41D to 44D.

Figure 6B:
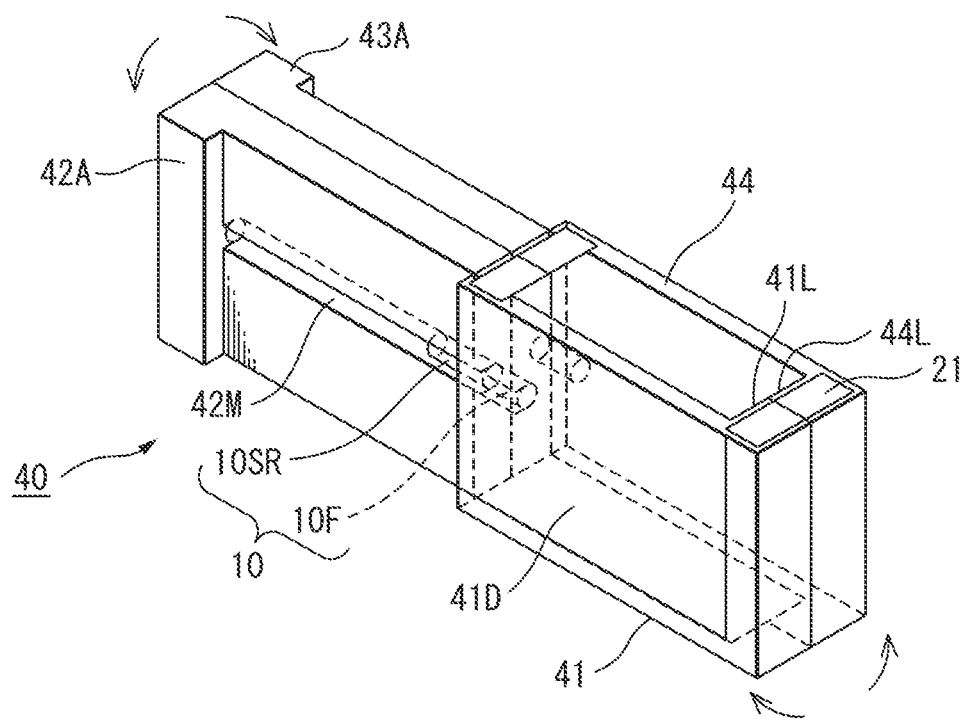
FIG. 6B is a perspective view which illustrates the full slide state where the outside two housing sections in the four housing sections of the electronic device which are illustrated in FIG. 6A are made to slide with respect to the inside two housing sections.
Figure 6C:
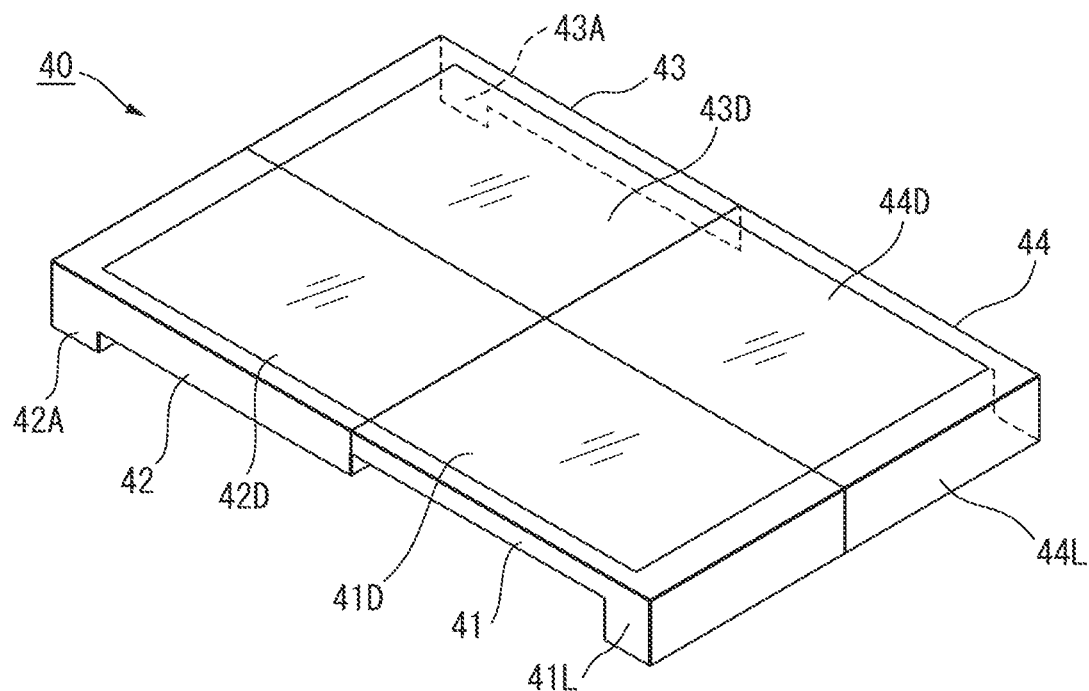
FIG. 6C is a perspective view which illustrates the state where the outside two housing sections and the inside two housing sections are opened in the arrow directions and made to rotate about the first connecting devices and the shafts of the hinges of the second connecting devices by 180 degrees whereby a flat surface is formed from the state which is illustrated in FIG. 6B.

Therefore, in the electronic device 40 of the fourth embodiment as well, when the first to fourth housing sections 41 to 44 are opened from the closed state, first, the first and fourth housing sections 41, 44 are made to slide with respect to the second and third housing sections 42, 43 in the direction shown by the arrow in FIG. 6A to render them the state illustrated in FIG. 6B. Further, in the state of FIG. 6B, the end parts of the first and fourth housing sections 41, 44 and the end parts of the second and third housing sections 42, 43 are spread apart in the arrow directions. This being so, when the first and fourth housing sections 41, 44 and the second and third housing sections 42, 43 are rotated about the first connecting devices 10 by 180 degrees, the result becomes the full flat state such as illustrated in FIG. 6C. In the full flat state, the displays 41D to 44D at all of the housing sections 41 to 44 adjoin each other and form a single screen. In this way, even if the thicknesses of the second and third housing sections 42, 43 become greater than the other housing sections 41, 44, it is possible to make the displays 41D to 44D at all of the housing sections 41 to 44 adjoin each other and form a single screen.

Figure 7A:
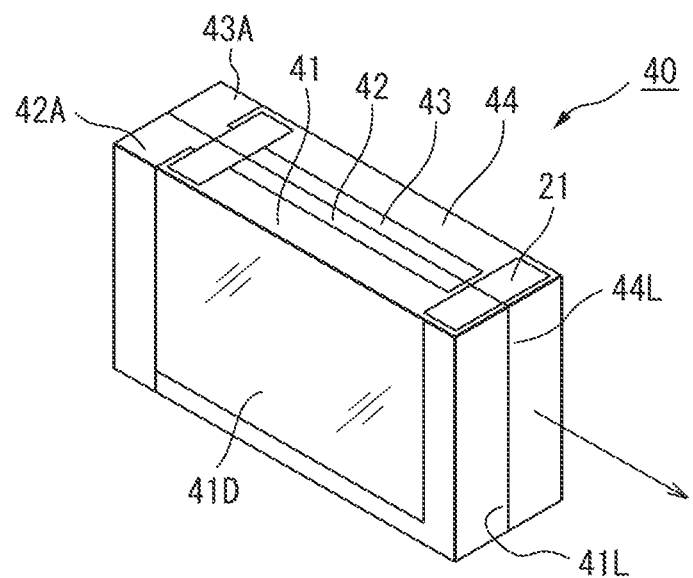
FIG. 7A is a perspective view which illustrates the closed state of the electronic device of the fifth embodiment which is provided with the multi-section housing of uneven thickness which is connected by the first connecting devices and second connecting devices of the second aspect.

FIG. 7A illustrates the closed state of the electronic device 40 of the fifth embodiment which is formed by the four housing sections 41 to 44 stacked in that order in the case where the thicknesses of the first and fourth housing sections 41, 44 are greater than the second and third housing sections 42, 43. The only point on which the electronic device 40 of the fifth embodiment differs from the electronic device 40 of the fourth embodiment is the point that the housing sections with the different thicknesses are reversed between the inside and outside. For the first connecting devices 10, first connecting devices 10 of the second aspect the same as the fourth embodiment are used. That is, in the fourth embodiment, the thicknesses of the second and third housing sections 42, 43 are greater than the thicknesses of the first and fourth housing sections 41, 44, but in the fifth embodiment, the thicknesses of the first and fourth housing sections 41, 44 are greater than the thicknesses of the second and third housing sections 42, 43. Further, the attachment positions of the first hinges 21 and the second hinges 22 which are included in the second connecting devices are also the same as in the fourth embodiment. The positions of the displays 41D to 44D which are provided at the first to fourth housing sections 41 to 44 are also the same.

In the electronic device 40 of the fifth embodiment, the thicknesses of the first and fourth housing sections 41, 44 are greater than the second and third housing sections 41, 44, so the heights of the leg parts 41L, 44L become lower compared with the heights of the holding parts 42A, 43A. Further, the thicknesses of the second and third housing sections 42, 43 are the same and thin, so the heights of the leg parts 41L, 44L are formed high. Therefore, the grooves of the second and third housing sections 42, 43 are provided with bank parts 42B, 43B. In the fifth embodiment, the thicknesses of the first and fourth housing sections 41, 44 are greater than the second and third housing sections 42, 43, but the placement surfaces of the holding parts 42A, 43A and leg parts 41L, 44L are formed to be the same in heights from the displays 41D to 44D.

Figure 7B:
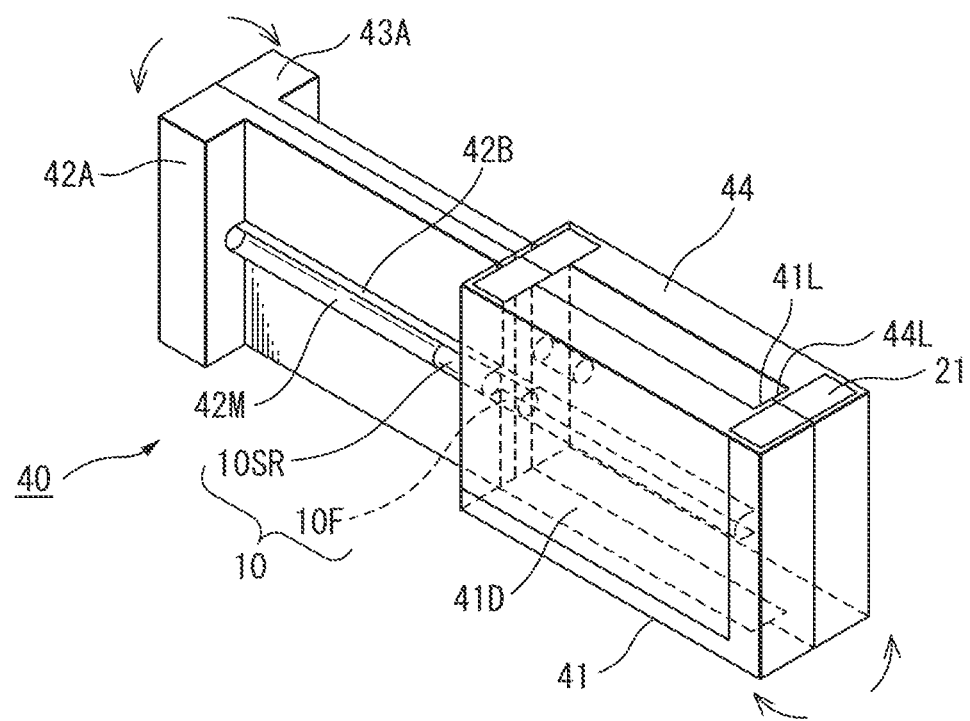
FIG. 7B is a perspective view which illustrates the full slide state where the outside two housing sections in the four housing sections of the electronic device which are illustrated in FIG. 7A are made to slide with respect to the inside two housing sections.
Figure 7C:
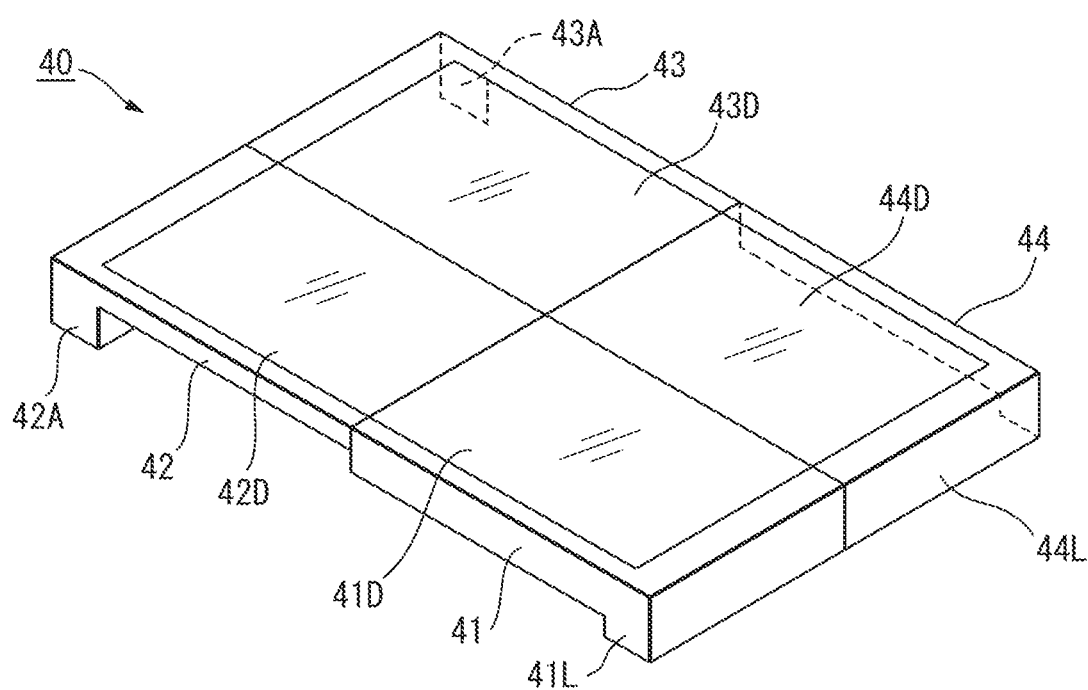
FIG. 7C is a perspective view which illustrates the state where the outside two housing sections and the inside two housing sections are opened in the arrow directions and made to rotate about the first connecting devices and the shafts of the hinges of the second connecting devices by 180 degrees whereby a flat surface is formed from the state which is illustrated in FIG. 7B.

In the electronic device 40 of the fifth embodiment as well, when opening the first to fourth housing sections 41 to 44 from the closed state, first, the first and fourth housing sections 41, 44 are made to slide with respect to the second and third housing sections 42, 43 in the direction shown by the arrow in FIG. 7A to obtain the state the state which is illustrated in FIG. 7B. Further, in the state of FIG. 7B, the end parts of the first and fourth housing sections 41, 44 and the end parts of the second and third housing sections 42, 43 are spread apart in the arrow directions. This being so, the first and fourth housing sections 41, 44 and the second and third housing sections 42, 43 are rotated about the first connecting devices 10 by 180 degrees to obtain the full flat state such as illustrated in FIG. 7C. In the full flat state, the displays 41D to 44D at all of the housing sections 41 to 44 adjoin each other and form a single screen. In this way, even if the thicknesses of the first and fourth housing sections 42, 43 become greater than the other housing sections 42, 43, it is possible to make the displays 41D to 44D at all of the housing sections 41 to 44 adjoin each other to form a single screen.

Figure 8A:
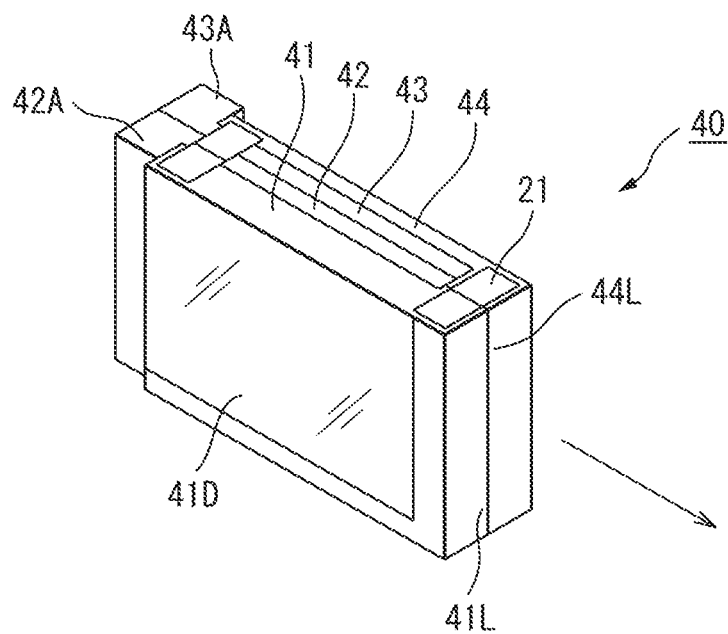
FIG. 8A is a perspective view which illustrates the closed state of the electronic device of the sixth embodiment which is provided with the multi-section housing of uneven thickness which is connected by the first connecting devices and second connecting devices of the second aspect.

FIG. 8A illustrates the closed state of the electronic device 40 of the sixth embodiment which is formed by the four housing sections 41 to 44 stacked in that order in the case where the thicknesses of the first to fourth housing sections 41 to 44 all differ. In the sixth embodiment, for example, the thickness of the first housing section 41 is made 7 mm, the thickness of the second housing section 42 is made 3 mm, the thickness of the third housing section 43 is made 2.9 mm, and the thickness of the fourth housing section 44 is made 2.8 mm. The point where the electronic device 40 of the sixth embodiment differs from the electronic device 40 of the fifth embodiment is that the thicknesses of all of the housing sections differ. For the first connecting devices 10, first connecting devices 10 of the second aspect the same as in the fifth embodiment are used. That is, in the fifth embodiment, the thicknesses of the first to fourth housing sections 41 to 44 all differ. Further, the attachment positions of the first hinges 21 and second hinges 22 which are contained in the second connecting devices are the same as in the fifth embodiment. The positions of the displays 41D to 44D which are provided at the first to fourth housing sections 41 to 44 are also the same.

In the electronic device 40 of the sixth embodiment, the thicknesses of the first to fourth housing sections 41 to 44 all differ, so the heights of the holding parts 42A, 43A and the leg parts 41L, 44L all differ. However, in the sixth embodiment, the thicknesses of the first to fourth housing sections 41 to 44 all differ, but the placement surfaces of the holding parts 42A, 43A and leg parts 41L, 44L are formed to the same heights from the displays 41D to 44D. Further, the groove 42M of the second housing section 42 is provided with the bank part 42B.

Figure 8B:
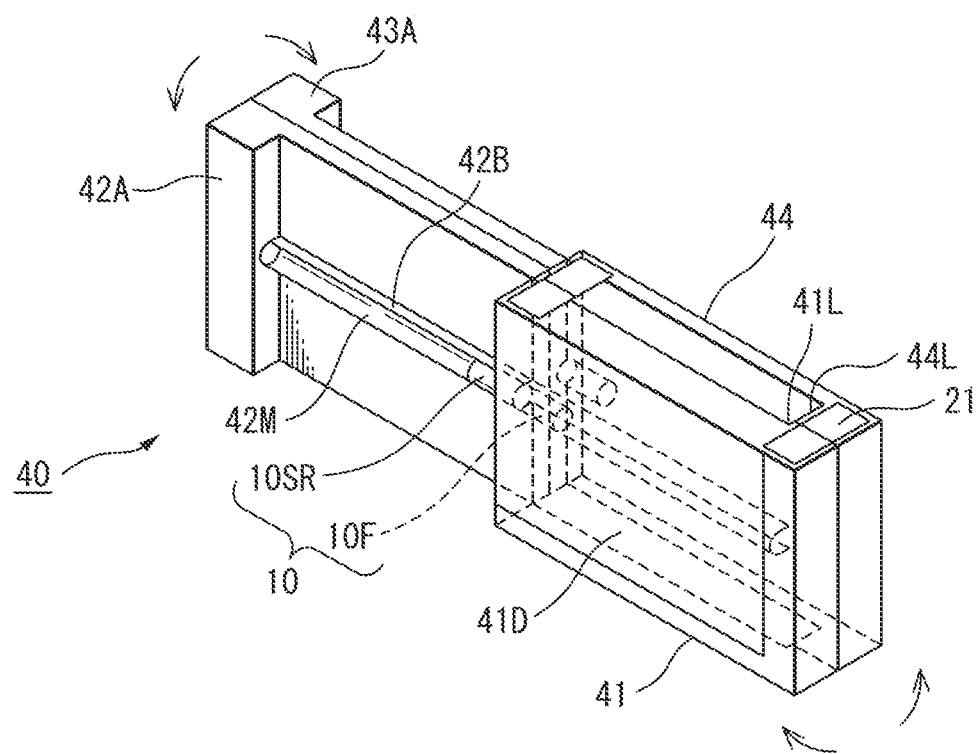
FIG. 8B is a perspective view which illustrates the full slide state where the outside two housing sections in the four housing sections of the electronic device which are illustrated in FIG. 8A are made to slide with respect to the inside two housing sections.
Figure 8C:
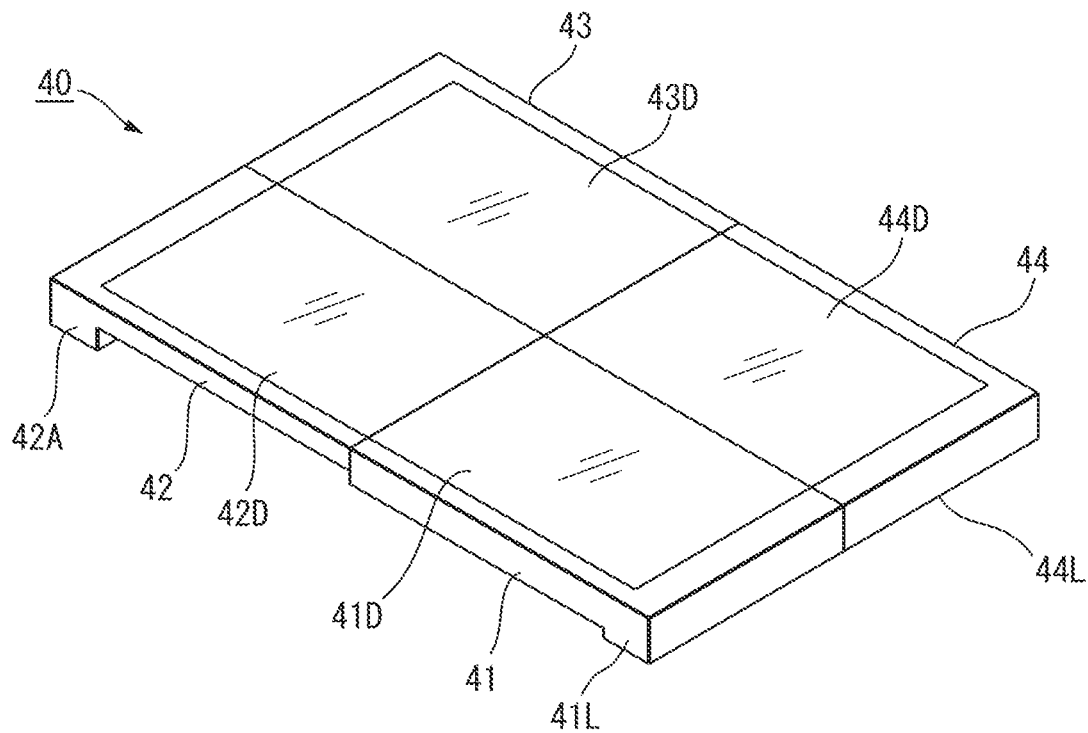
FIG. 8C is a perspective view which illustrates the state where the outside two housing sections and the inside two housing sections are opened in the arrow directions and made to rotate about the first connecting devices and the shafts of the hinges of the second connecting devices by 180 degrees whereby a flat surface is formed from the state which is illustrated in FIG. 8B.

In the electronic device 40 of the sixth embodiment as well, when the first to fourth housing sections 41 to 44 open from the closed state, first, the first and fourth housing sections 41, 44 are made to slide with respect to the second and third housing sections 42, 43 in the direction which is illustrated by the arrows in FIG. 8A to obtain the state which is illustrated in FIG. 8B. Further, in the state of FIG. 8B, the end parts of the first and fourth housing sections 41, 44 and the end parts of the second and third housing sections 42, 43 are spread apart in the arrow directions. This being so, when the first and fourth housing sections 41, 44 and the second and third housing sections 42, 43 are rotated about the first connecting devices 10 by 180 degrees, the fully flat state such as illustrated in FIG. 8C is obtained. In the full flat state, the displays 41D to 44D at all of the housing sections 41 to 44 adjoin each other to form a single screen. In this way, even if the thicknesses of the first to fourth housing sections 41 to 44 are all different, the displays 41D to 44D at all of the housing sections 41 to 44 can adjoin each other to form a single screen.

Figure 9A:
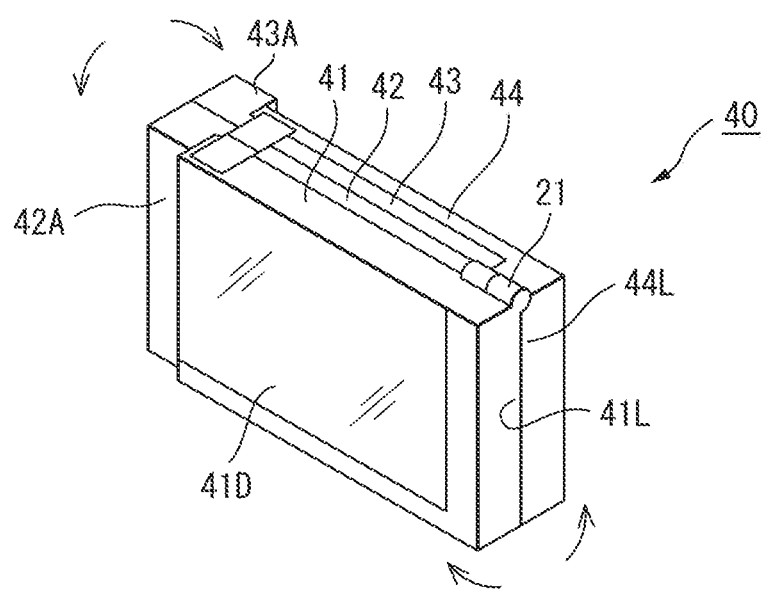
FIG. 9A is a perspective view which illustrates the closed state of the electronic device of the seventh embodiment which is provided with the multi-section housing of uneven thickness which is connected by specific examples of the first connecting devices and second connecting devices of the second aspect.

FIG. 9A illustrates the closed state of the electronic device 40 of the seventh embodiment which is formed by the four housing sections 41 to 44 stacked in that order in the case where the thickness of the first housing section 41 differs from the other second to fourth housing sections 42 to 44. The first to fourth housing sections 41 to 44 have the screens (displays) 41D to 44D. The displays 41D, 44D are exposed, but the displays 42D, 43D face each other in state and are hidden. Further, in the seventh embodiment, one of the first hinges 21 of the second connecting devices is structured to enable passage of wire for transmitting a signal. The second hinges are not illustrated, but are attached to the end faces of the second and third housing sections 42, 43. Further, for the first connecting devices 10, the first connecting devices 10 of the second aspect the same as the sixth embodiment are used.

Figure 9B:
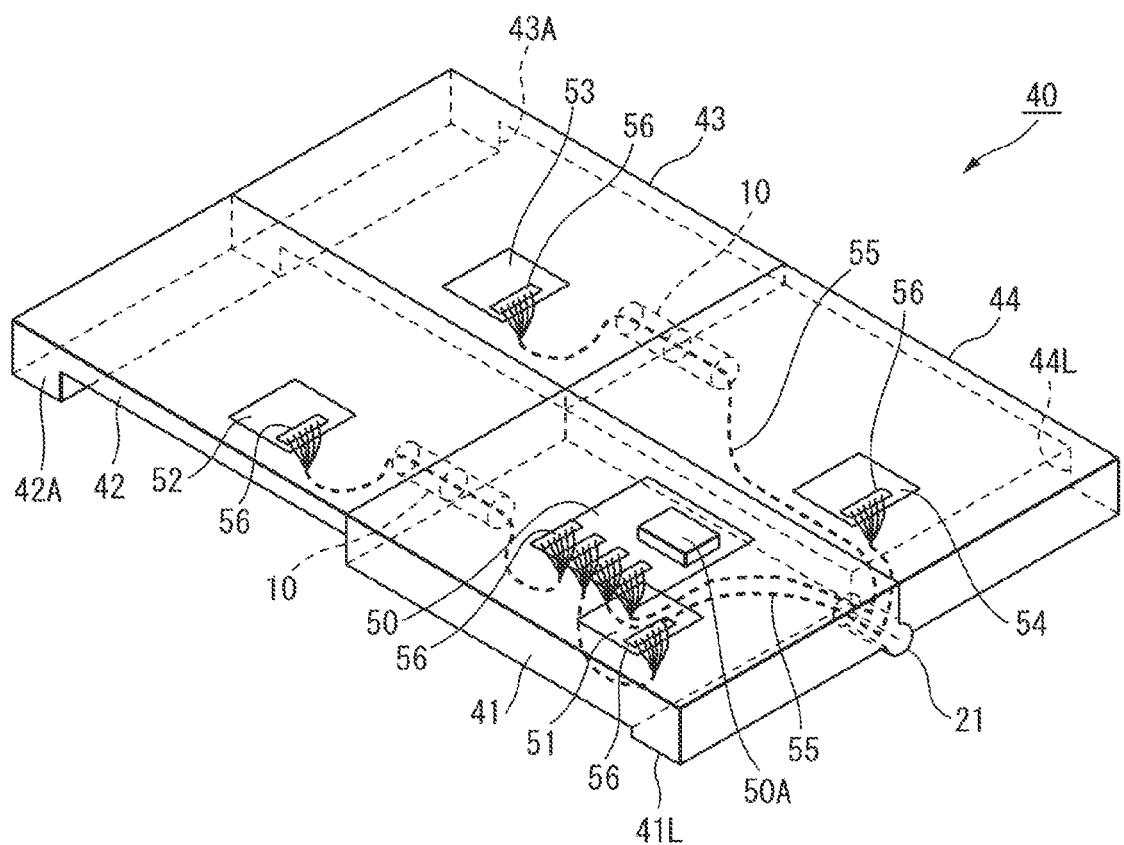
FIG. 9B is a perspective view which illustrates the state where the electronic device which is illustrated in FIG. 9A is spread open and illustrates the electrical wiring between housing sections.

FIG. 9B illustrates the state where the electronic device 40 which is illustrated in FIG. 9A is spread open and illustrates the electrical wiring between the housing sections. The first and second housing sections 41, 42 and the third and fourth housing sections 43, 44 are connected by first connecting devices 10. The two first connecting devices 10 are structured to enable electrical wiring to be inserted. Further, the first and fourth housing sections 41, 44 are connected by the first hinges 21, while the second and third housing sections 42, 43 are connected by the second hinges (not illustrated). Further, one of the first hinges 21, in the same way as the first connecting device 10, is structured to enable insertion of electrical wiring.

In the seventh embodiment, the back surface of the first housing section 41 is provided with a main board 50 on which a CPU 50A is mounted as a control device and which controls the electronic device 40 as a whole. The back surfaces of the housing sections 41 to 44 are provided with display-use circuit boards 51 to 54. These control the display of the display parts. The main board 50 and the display-use circuit boards 51 to 54 are connected by fine cable bundles 55. The two end parts of the fine cable bundles 55 are provided with connection-use connectors 56 attached to them. The control device can work together with the display-use circuit boards 51 to 54 to display an image of a quarter of a screen's worth of a single display image in synchronization with the other screens.

The fine cable bundle 55 which connects the main board 50 and the first display-use circuit board 51 is directly connected, but the fine cable bundle 55 which connects the main board 50 and the second display-use circuit board 52 is arranged passing through the first connecting device 10. Further, the fine cable bundle 55 which connects the main board 50 and the third display-use circuit board 53 is arranged passing through the first hinge 21 and passing through the first connecting device 10. Furthermore, the fine cable bundle 55 which connects the main board 50 and the fourth display-use circuit board 54 is arranged through the first hinge 21. Due to this structure, it becomes possible to display a single large image on a single large screen of the electronic device 40.

Figure 10A:
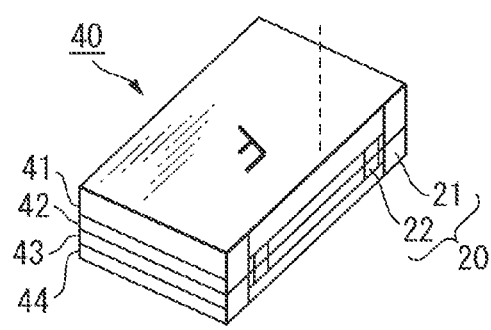
FIG. 10A is a perspective view which illustrates the closed state of the electronic device of the eighth embodiment which is provided with the multi-section housing of uneven thickness which is connected by the first connecting devices and second connecting devices of the third aspect.

FIG. 10A illustrates the closed state of the electronic device 40 of the eighth embodiment which is formed by the four housing sections 41 to 44 being superposed in that order in the case where the thickness of the first housing section 41 is thicker than the other second to fourth housing sections 42 to 44. The first to fourth housing sections 41 to 44 respectively have displays. Further, in the eighth embodiment as well, the second connecting devices 20 are provided with the first hinges 21 and the second hinges 22. The first hinges 21 connect the end faces of the first and fourth housing sections 41, 44, while the second hinges 22 connect the second and third housing sections 42, 43. In the electronic device 40 of the eighth embodiment, the first connecting devices 10 of the third aspect are used for the first connecting devices 10.

In the electronic device 40 of the eighth embodiment, between the first housing section 41 and the second housing section 42 and between the third housing section 43 and the fourth housing section 44, first connecting devices 10 of the third aspect which are provided with the two shafts 11, 12 are provided. The first connecting devices 10 are provided at the end faces of the first to fourth housing sections 41 to 44 adjoining the end faces where the second connecting devices 20 are provided. The first shafts 11 and second shafts 12 of the electronic device 40 of the eighth embodiment are perpendicular. The first shafts 11 are provided in the thickness direction of the housing sections.

Figure 10B:
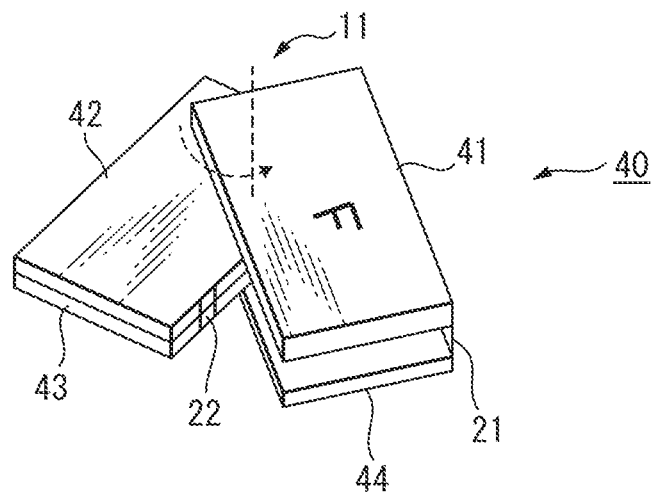
FIG. 10B is a perspective view which illustrates the state where the first and fourth two housing sections in the four housing sections which are illustrated in FIG. 10A start to be made to rotate with respect to the inside second and third two housing sections about the first shafts of the first connecting devices.
Figure 10C:
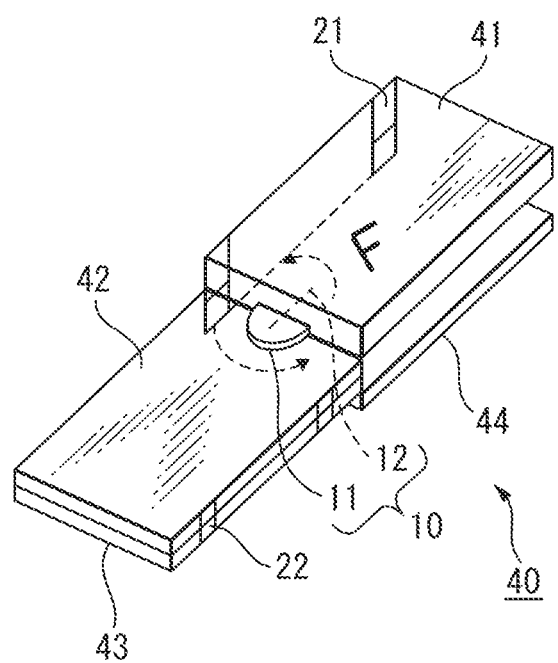
FIG. 10C is a perspective view of the state where the first and fourth housing sections which are illustrated in FIG. 10B are rotated by 180 degrees with respect to the second and third housing sections.

FIG. 10B illustrates the state where the first and fourth housing sections 41, 44 which are illustrated in FIG. 10A start to be rotated with respect to the second and third housing sections 42, 43 about the first shaft 11. FIG. 10C illustrates the state where the first and fourth housing sections 41, 44 which are illustrated in FIG. 10B are rotated with respect to the second and third housing sections 42, 43 by 180 degrees. This figure illustrates the first shaft 11 and second shaft. The first shaft 11 is a columnar shaft which has the second shaft 12 built into it. In the state where the first and fourth housing sections 41, 44 are rotated with respect to the second and third housing sections 42, 43 by 180 degrees, there are no overlapping parts between the first and fourth housing sections 41, 44 and the second and third housing sections 42, 43.

Figure 10D:
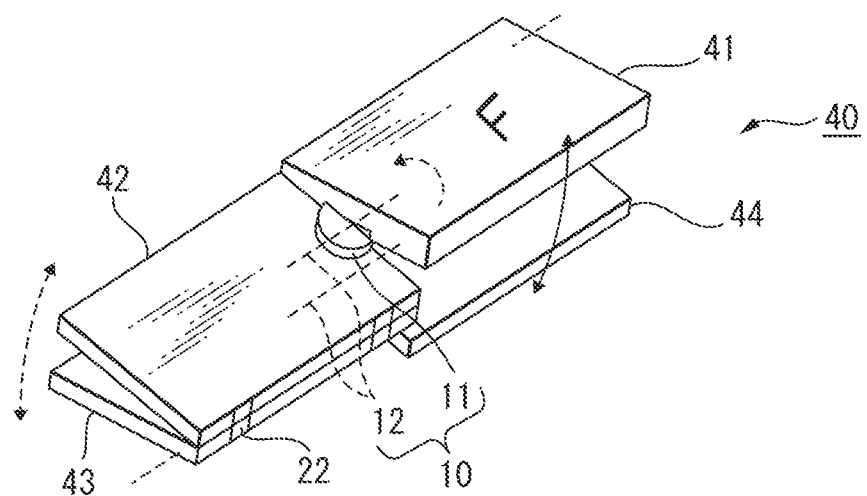
FIG. 10D is a perspective view which illustrates the state where the first and second housing sections and the third and fourth housing sections are made to rotate about the second shafts of the first connecting devices and where the first and fourth housing sections and second and third housing sections start to be made to rotate about the hinge shafts of the second connecting devices from the state which is illustrated in FIG. 10E.
Figure 10E:
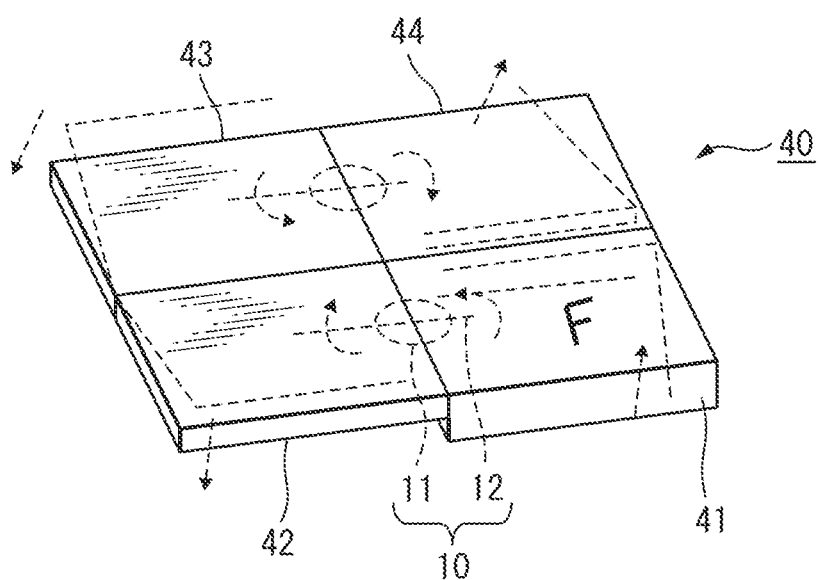
FIG. 10E is a perspective view which illustrates the immediately preceding state where the first and second housing sections and third and fourth housing sections are further rotated about the second shafts of the first connecting devices and the first and fourth housing sections and second and third housing sections are further rotated about the hinge shafts of the second connecting devices and a single flat surface is formed from the state which is illustrated in FIG. 10D.
Figure 10F:
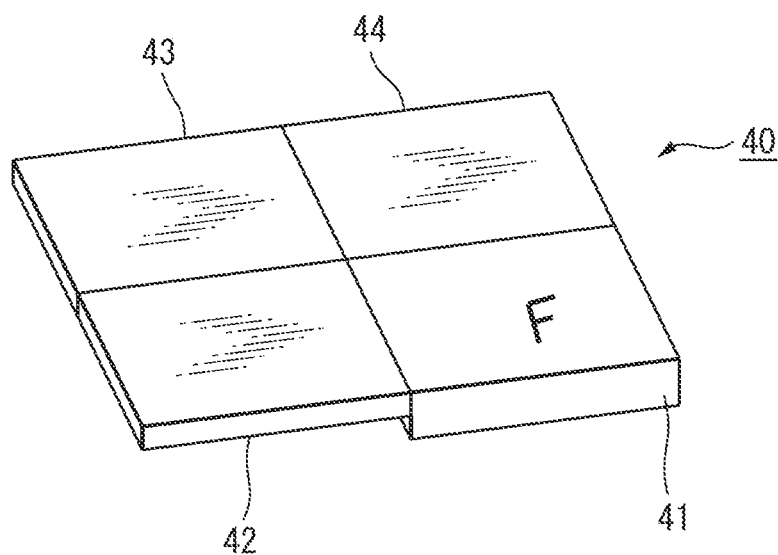
FIG. 10F is a perspective view which illustrates the state where the first and second housing sections and third and fourth housing sections are rotated about the second shafts of the first connecting devices by 180 degrees and the first and fourth housing sections and second and third housing sections are rotated about the hinge shafts of the second connecting devices by 180 degrees and a single flat surface is formed from the state which is illustrated in FIG. 10E.

FIG. 10D illustrates the state where the first and second housing sections 41, 42 and third and fourth housing sections 43, 44 are made to rotate about the second shaft 12 of the first connecting device 10 from the state which is illustrated in FIG. 10E. In this state, the first and fourth housing sections 41, 44 and the second and third housing sections 42, 43 are rotated about the first hinges 21 and second hinges 22 as well whereby they are opened in a V-shape. FIG. 10E illustrates the state where the first and second housing sections 41, 42 and the third and fourth housing sections 43, 44 are further rotated about the second shaft 12 and the first and fourth housing sections 41, 44 and the second and third housing sections 42, 43 are further rotated about the first and second hinges 21, 22. Further, if the first and second housing sections 41, 42 and the third and fourth housing sections 43, 44 are rotated about the second shaft 12 by 180 degrees and the first and fourth housing sections 41, 44 and second and third housing sections 42, 43 are rotated about the first and second hinges 21, 22 by 180 degrees, the result becomes the state which is illustrated in FIG. 10F. In this state, the displays of the first to fourth housing sections 41 to 44 adjoin each other in the flat state whereby a single large display screen is formed.

Figure 11A:
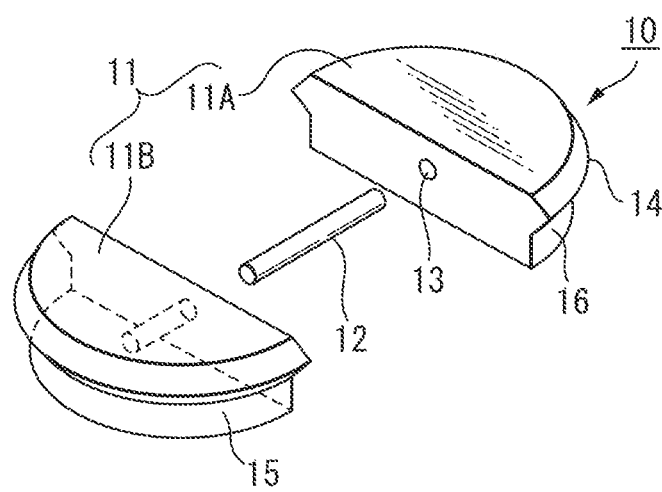
FIG. 11A is an assembled perspective view which illustrates the structure of a third aspect of the first connecting device of the present application which connects the first and second housing sections.
Figure 11B:
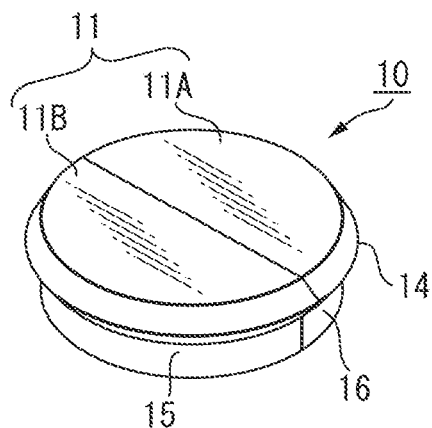
FIG. 11B is a perspective view which illustrates an assembled state of the first connecting device which is illustrated in FIG. 11A.
Figure 11C:
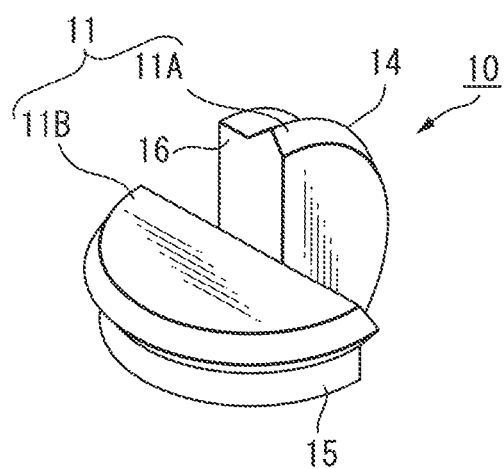
FIG. 11C is a perspective view which illustrates the state where one of the semicircular shafts which form the first shaft which is illustrated in FIG. 11B is rotated 90 degrees from the other.
Figure 11D:
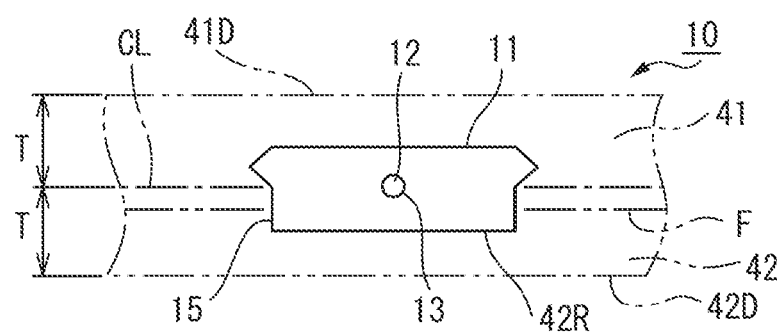
FIG. 11D is a cross-sectional view which illustrates the positions of the first and second shafts in the superposed state of the first and second housing sections of different thicknesses for the second shaft which is built into the first aspect of the first connecting device.
Figure 11E:
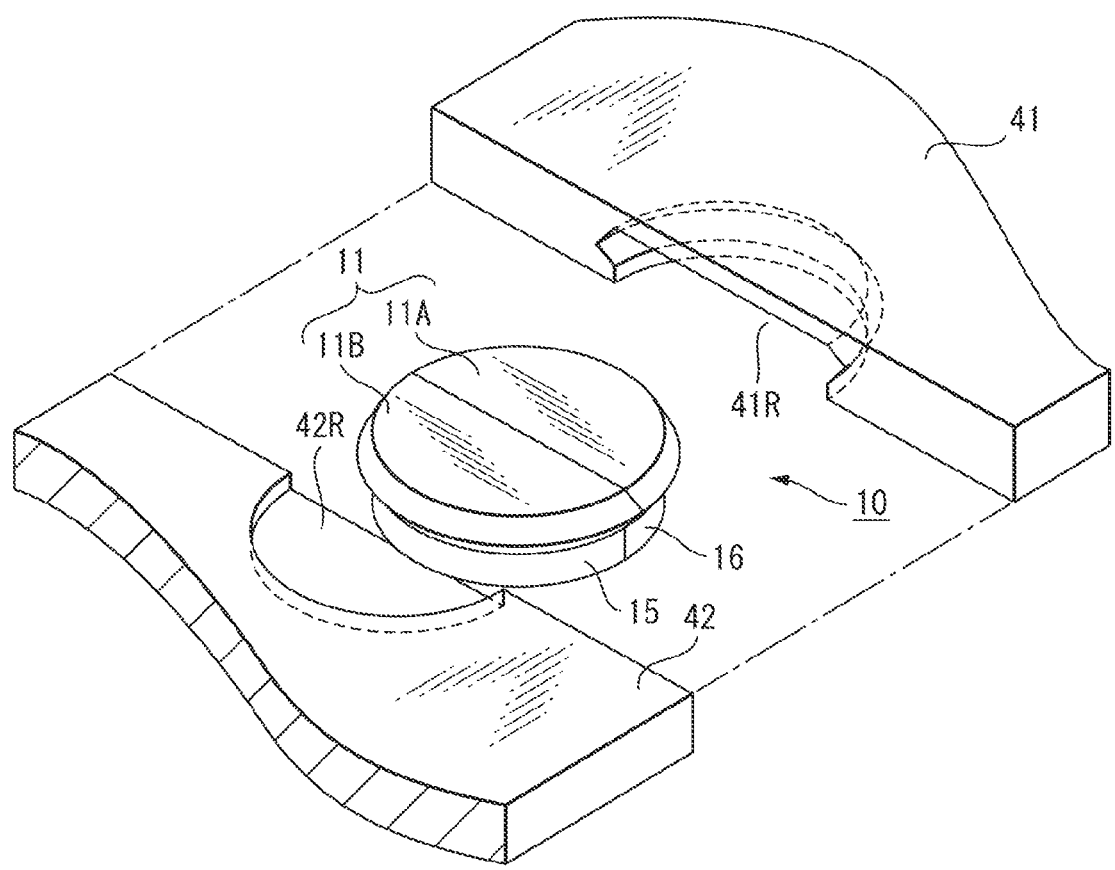
FIG. 11E is an assembled perspective view which illustrates the shapes of the end faces of the first and second housing sections together with the first connecting device when attaching the first connecting device of the first aspect which is illustrated in FIG. 11B to the end faces of the first and second housing sections.

FIG. 11A to FIG. 11C illustrate the structure and operation of a first connecting device 10 which is used in the electronic device 40 of the eighth embodiment, while FIG. 11D and FIG. 11E illustrate attachment of the first connecting device 10 which is illustrated from FIG. 11A to FIG. 11C to the first and second housing sections 41, 42. The attachment of the first connecting device 10 to the third and fourth housing sections 43, 44 is similar, so here the attachment of the first connecting device 10 to the first and second housing sections 41, 42 will be explained. Note that, in the electronic device 40 of the eighth embodiment, the thickness of the first housing section 41 is greater than the other housing sections 42 to 44.

As illustrated in FIG. 11A, the first connecting device 10 which is used in the electronic device 40 of the eighth embodiment is provided with a columnar first shaft 11 and a second shaft 12 which is provided at the inside of the first shaft 11 in a direction perpendicular to the axis of the first shaft 11. The first shaft 11 is provided in a vertical direction to the superposed surfaces of the first and second housing sections 41, 42. The axial line bisects the end faces. The columnar shaped first shaft 11 is divided into two to the left and right. These form a first semicircular shaft 11A and a second semicircular shaft 11B. The bisected surfaces of the first shaft 11 are provided with axial holes 13 which are perpendicular to the bisected surfaces. The axial holes 13 are provided so as to be perpendicular to the axial line of the first shaft 11. Further, the axial holes 13 of the first semicircular shaft 11A and the second semicircular shaft 11B have the second shaft 12 inserted into them. Therefore, the first shaft 11 and the second shaft 12 are perpendicular.

Further, at the parts close to the top surfaces of the first semicircular shaft 11A and the second semicircular shaft 11B, ridges 14 are provided circling the outer circumferential surface of the first shaft 11. At the first connecting device 10 which is used for the electronic device 40 of the eighth embodiment, the first semicircular shaft 11A is attached to the first housing section 41, while the second semicircular shaft 11B is fastened to the second housing section 42. Therefore, the bottom end part of the second semicircular shaft 11B is provided with an attachment projection 15. Further, in the present embodiment, the bottom end part of the first semicircular shaft 11A is also provided with a projection 16 of the same shape as the attachment projection 15, but the projection 16 need not be made the same shape as the attachment projection 15. The bottom end part of the first semicircular shaft 11A need only be shaped formed with an axial hole 13.

FIG. 11B illustrates the assembled state of the first connecting device 10 which is illustrated in FIG. 11A, while FIG. 11C illustrates the state where the first semicircular shaft 11A which is illustrated in FIG. 11B is rotated with respect to the second semicircular shaft 12A by 90 degrees. The first semicircular shaft 11A can be rotated with respect to the second semicircular shaft 12A by 180 degrees. The first connecting device 10 which is provided with the above structure, as illustrated in FIG. 11E, has an attachment projection 15 which is provided at the bottom end part of the second semicircular shaft 11B which is fit into the attachment recess 42R which is provided at the end part of the second housing section 42 and which is fastened there by a binder, screws, etc. The depth of the attachment recess 42R is shallower than the height of the attachment projection 15. In the state where the attachment projection 15 is attached to the attachment recess 42R, the upper side portion of the attachment projection 15 is exposed from the attachment recess 42R.

The reason why the upper side part of the attachment projection 15 is made to be exposed from the attachment recess 42R in the state where the attachment projection 15 is attached to the attachment recess 42R, as explained above, is that the thickness of the first housing section 41 is greater than the thickness of the second housing section 42. On the other hand, in the first connecting device 10 which is attached to the third and fourth housing sections 43, 44, the thicknesses of the third and fourth housing sections 43, 44 are the same, so the depth of the attachment recess 42R may be the same as the height of the attachment projection 15. The reason will be explained using FIG. 11D.

As illustrated in FIG. 11D, even when the thickness of the first housing section 41 is greater than the thickness of the second housing section 42, when making the first housing section 41 rotate about the second shaft 12 by 180 degrees, the display 41D of the first housing section has to become the same plane as the display 42D of the second housing section. Therefore, the second shaft 12 is not positioned on the superposed surfaces of the first housing section 41 and second housing section 42 but has to be provided on the center line CL which bisects by exactly T the distance from the display 41D of the first housing section to the display 42D of the second housing section. For this reason, in the present embodiment, the height of the attachment projection 15 is made higher than the depth of the attachment recess 42R and the shaft 12 is provided on the center line CL which bisects by exactly T the distance from the display 41D of the first housing section to the display 42D of the second housing section.

In this way, on the superposed surface F of the second housing section 42, the upper side portion of the attachment projection 15 and the first shaft 11 stick out, so at the bottom end part of the first housing section 41, a rotary groove 41R is formed in which the projecting part is received and rotated. The ridge 14 which is provided at the top side of the first semicircular shaft 11A and the upper side part of the attachment projection 15 can be fit into a rotary groove 41R which is provided at the bottom end part of the first housing section 41 to be able to rotate. Further, due to the ridges 14 which are provided at the first shaft 11, the first housing section 41 can no longer be pulled out to the top side with respect to the first shaft 11. That is, the ridge 14 is a ridge for preventing detachment so that the first housing section 41 does not detach from the upper side.

The first housing section 41 with the rotary groove 41R fit with the first semicircular shaft 11A can rotate about the first shaft 11, that is, up to the second semicircular shaft 11B side, if the first semicircular shaft 11A does not rotate about the second shaft 12 with respect to the second semicircular shaft 12A. Note that, in the present embodiment, to facilitate understanding of the configuration, the diameter of the first shaft 11 is drawn large, but the diameter of the first shaft 11 need only be a size which can hold the second shaft 12 and is not particularly limited.

Due to this configuration, if using the first shaft 11 to make the second housing section 42 which is superposed under the first housing section 41 rotate by 180 degrees and in this state making the first housing section 41 rotate by the second shaft 12 by 180 degrees, the displays 41D, 42D of the first and second housing sections can be formed on the same plane. Note that, the mechanism for preventing the first shaft 11 which had been fit into the rotary groove 41R from detaching in the horizontal direction is not illustrated, but the following such mechanism may be considered. For example, if forming a circumferential groove at the top surface of the columnar shaped first shaft 11 and fitting the ridges 14 into the rotary groove 41R, then positioning the front end part of the pin which is attached from the display surface side of the first housing section 41, the first shaft 11 which is fit into the rotary groove 41R will not detach in the horizontal direction.

Figure 12A:
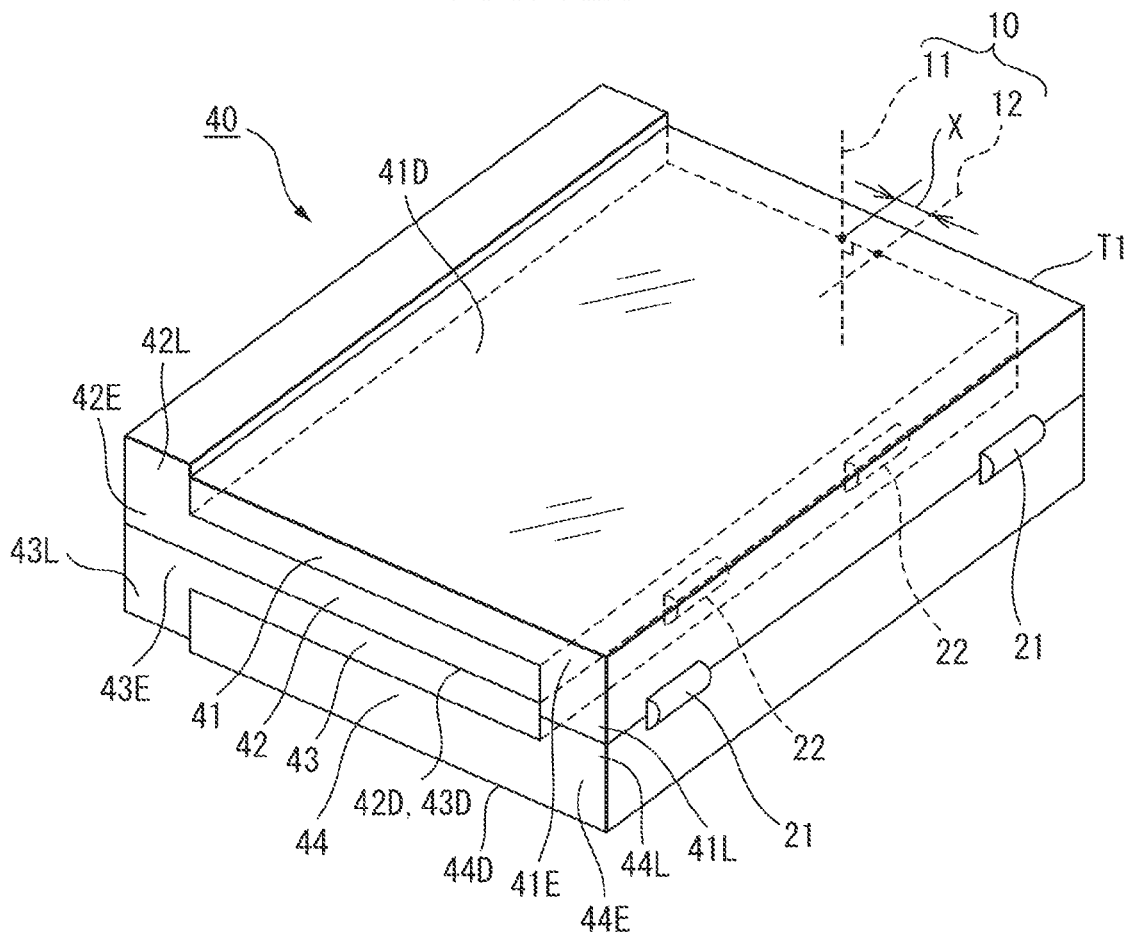
FIG. 12A is a perspective view which illustrates the closed state of the electronic device of the ninth embodiment which is provided with a multi-section housing of an uneven thickness which is connected by the first connecting devices and second connecting devices of the fourth aspect.
Figure 12B:
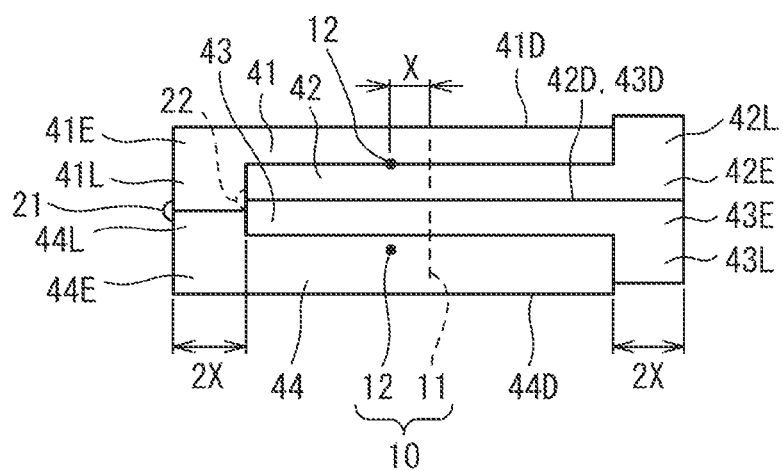
FIG. 12B is a side view of an electronic device which illustrates the positions of the first shafts and second shafts of first connecting devices of the fourth aspect of the present application which are provided between the first and second housing sections and the third and fourth housing sections in FIG. 12A.

FIG. 12A illustrates the closed state of the electronic device 40 of the ninth embodiment which is formed from the four housing sections 41 to 44 stacked in that order in the case where the thickness of the fourth housing section 44 is thicker than the other first to third housing sections 41 to 43. In the electronic device 40 of the ninth embodiment, the first connecting device 10 of the fourth aspect is used for the first connecting device 10. FIG. 12B illustrates the electronic device 40 which is illustrated in FIG. 12A as seen from the end face side where a first connecting device 10 is attached.

The first connecting device 10 of the third aspect had the second shaft 12 perpendicular to the first shaft 11, but the first connecting device 10 of the fourth aspect has the second shaft 12 not perpendicular to the first shaft 11, but twisted from it in position. The second shaft 12 which is provided between the first and second housing sections 41, 42 is positioned at the superposed surfaces of the first and second housing sections 41, 42. On the other hand, the second shaft 12 which is provided between the third and fourth housing sections 43, 44 is provided at a position of half the thickness of the thickness when the third and fourth housing sections 43, 44 are superposed.

In the electronic device 40 of the ninth embodiment, the displays 41D, 44D of the first and fourth housing sections are exposed to the outside, while the display 42D of the second housing section 42 and the display 43D of the third housing section are superposed. Further, in the first connecting device 10 of the fourth aspect, in the second shaft 12 of the first connecting device 10 which is at a position twisted from the first shaft 11, the length of the normal which descends from the first shaft 11 to the second shaft 12 is X.

In this case, when using the first connecting devices 10 of the fourth aspect to connect the end faces T1 of the first and second housing sections 41, 42 and the third and fourth housing sections 43, 44, the end parts of the housing sections 41 to 44 are provided with extended parts 41E to 44E so that after being spread open, the screens form a continuous flat surface. The extended parts 41E, 44E extend at the sides where the second connecting devices 20 are attached, while the extended parts 42E, 43E extend to the opposite sides. Further, at the back sides of the extended part 41E to extended part 44E, there are provided leg parts 41L, 44L which are provided with heights so that the distances from the displays 41D to 44D to the placement surface of the electronic device 40 become the same when the housing sections 41 to 44 are spread open and the displays 41D to 44D become flat.

The extended lengths of the extended parts 41E to 44E are made 2X when the first shafts 11 are at center point positions of the distance Y between the extended parts 41E, 44E and the extended parts and the length of the normal descending from the first shafts 11 to the second shafts 12 is X. This is because if the length of the normal descending from the first shafts 11 to the second shafts 12 is X, if rotating the first to fourth housing sections 41, 44 about the first shafts 11 in the arrow mark direction by 180 degrees, the positions of the second shafts 12 will deviate from the original position by 2X. Further, if making the extended lengths of the extended parts 41E, 42E the lengths of 2X, when making the first and fourth housing sections 41, 44 rotate about the first shafts 11 by 180 degrees, the second shafts 12 becomes positions bisecting the width Z of the housing sections in that state. Therefore, in this state, even if making the second housing section 42 rotate about the second shaft 12 by 180 degrees, no step difference arises between the end faces of the first and second housing sections 41, 42 and the end faces of the third and fourth housing sections 43, 44.

Further, the first hinges 21 of the second connecting devices 20 are attached between the extended parts 41E, 44E, while the second hinges 22 are attached at the end faces of the housing sections 42, 43 at the opposite sides to the extended parts 42E, 43E. Due to this structure, first, the first and fourth housing sections 41, 44 are made to rotate about the first shafts 11 with respect to the second and third housing sections 42, 43 by 180 degrees to arrange the first and fourth housing sections 41, 44 at the sides of the second and third housing sections 42, 43. Next, if opening the first and fourth housing sections 41, 44 about the first hinges 21 as the center of rotation into a V-shape and opening the second and third housing sections 42, 43 about the second hinges 22 as the center of rotation, the displays of the first to fourth housing sections 41 to 44 become flat.

Figure 13A:
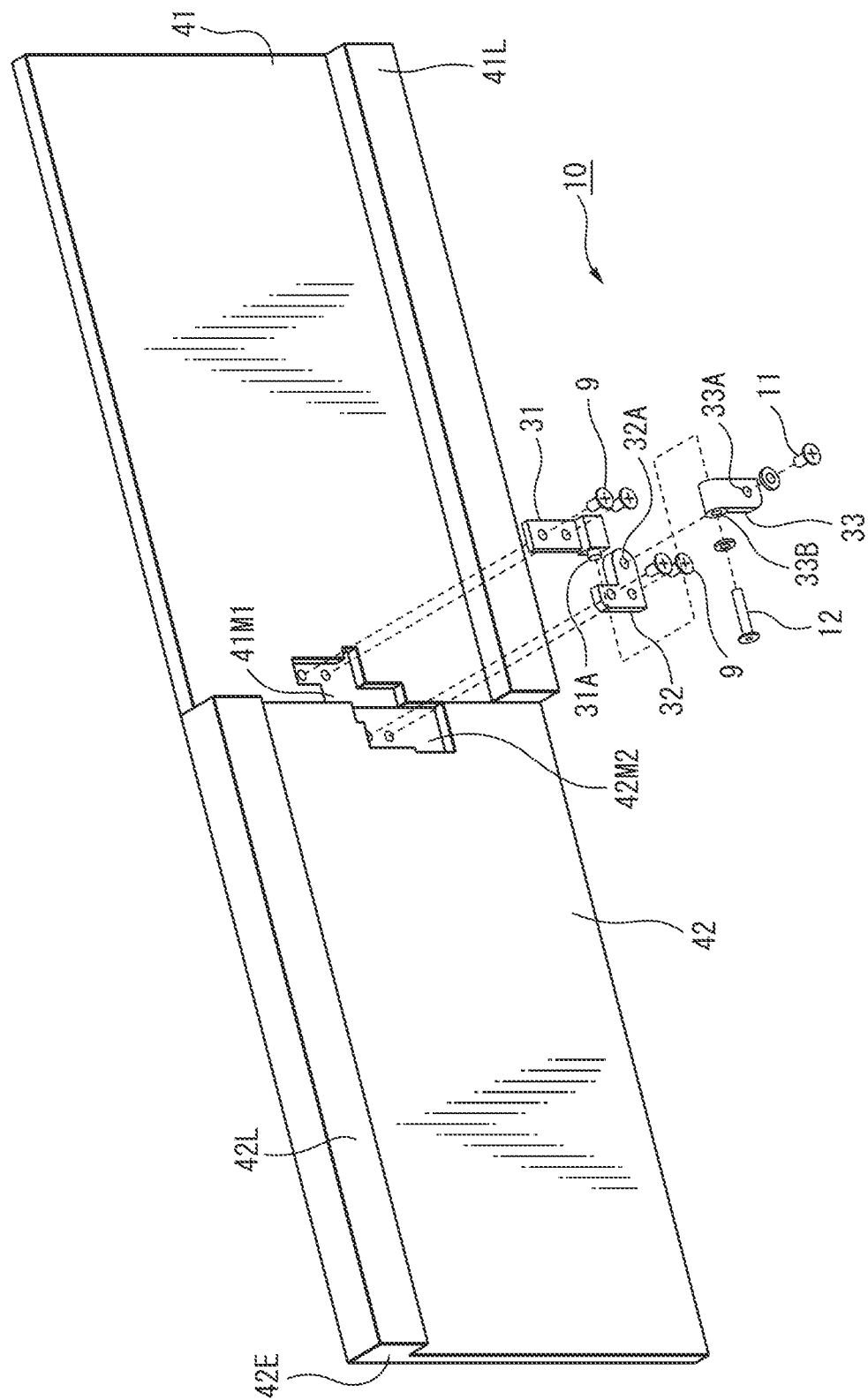
FIG. 13A is an assembled perspective view which illustrates the structure of a specific embodiment of a first connecting device of the fourth aspect of the present application.

FIG. 13A is an assembled perspective view which illustrates the structure of a specific example of the first connecting device 10 of the fourth aspect of the present application. FIG. 13A illustrates the first connecting device 10 which is attached between the first and second housing sections 41, 42. Here, the thicknesses of the first and second housing sections 41, 42 are assumed to be the same. The first connecting device which is attached between the third and fourth housing sections 43, 44 has a shape in a mirror image relationship with the first connecting device 10 which is illustrated in FIG. 13A. The component members are completely the same, so illustration and explanation will be omitted. The first connecting device 10 of the fourth aspect is provided with a first fastening plate 31 and second fastening plate 31 for attaching the first shaft 11 and the second shaft 12 to the first and second housing sections 41, 42 and with a moving member 33.

The first fastening plate 31 is attached by screws 9 to the recessed part 41M which is provided at the end part of the first housing section 41. The first fastening plate 31 is provided with a hole 31A for attaching the second shaft 12. The second fastening plate 32 is attached by screws 9 to the recessed part 42M which is provided at the end part of the second housing section 42. The second fastening plate 32 is provided with a hole 32A for inserting the first shaft 11. The moving member 33 is provided with a hole 33A for inserting the first shaft 11 and a hole 33B for inserting the second shaft 12. The hole 33A and the hole 33B are at twisted positions. The first shaft 11 is inserted into the hole 33A of the moving member 33, then is attached to the hole 32A of the second fastening plate 32. The second shaft 12 is inserted into the hole 33B, then is attached to the hole 31A of the first fastening plate 31.

Figure 13B:
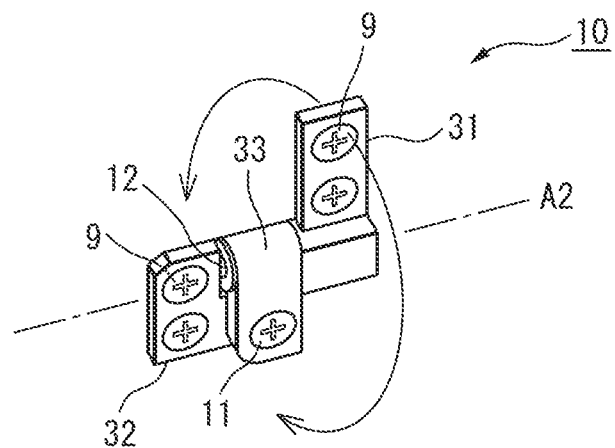
FIG. 13B is a perspective view of a first connecting device 13C which illustrates the assembled state of the first connecting device of the fourth aspect which is illustrated in FIG. 13A.
Figure 13C:
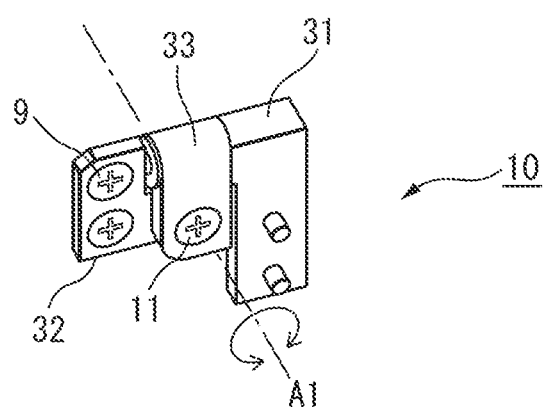
FIG. 13C is a perspective view which illustrates the state where the first fastening plate is rotated by 180 degrees from the second fastening plate of the first connecting device of the fourth aspect which is illustrated in FIG. 13B.

FIG. 13B illustrates the assembled state of the first connecting device 10 of the fourth aspect which is illustrated in FIG. 13A. Further, FIG. 13C illustrates the state where the first fastening plate 31 is rotated with respect to the second fastening plate 32 of the first connecting device 10 of the fourth aspect which is illustrated in FIG. 13B about the second shaft 12 by 180 degrees. Further, in the state which is illustrated in FIG. 13C, the first fastening plate 31 can be rotated about the first shaft 11 by 180 degrees.

Figure 14A:
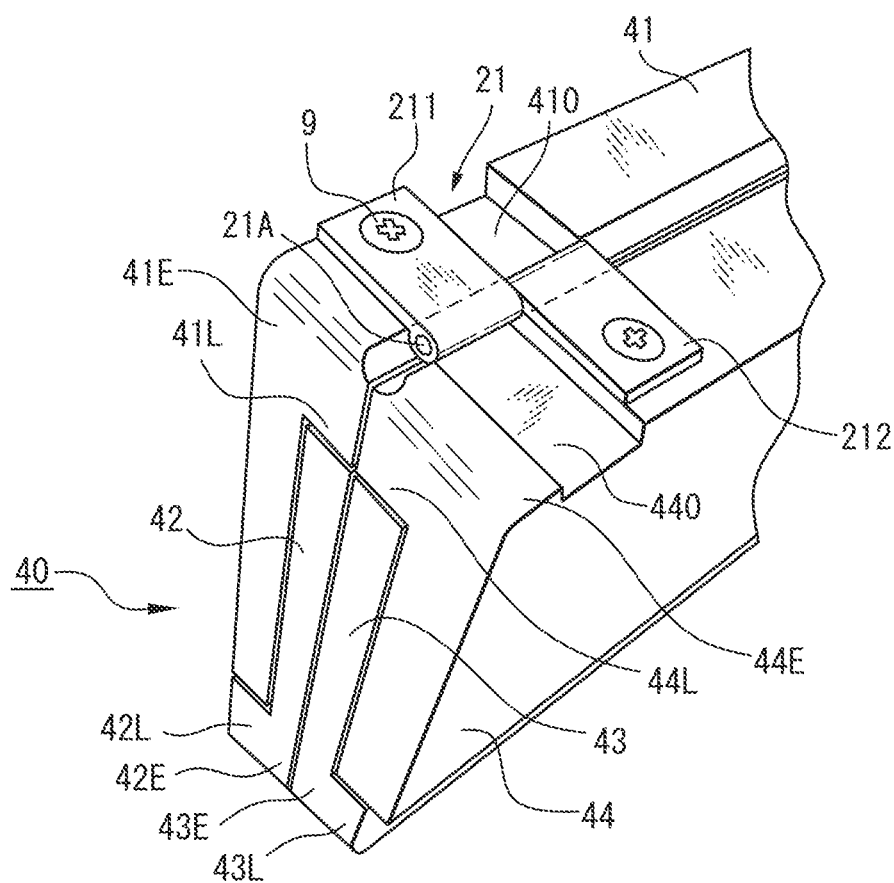
FIG. 14A is a perspective view which illustrates the structure of one embodiment of a first hinge which is illustrated in FIG. 12A.

FIG. 14A illustrates the structure of one embodiment of the first hinge 21 which is provided spanning the leg part 41L of the first housing section 41 and the leg part 44L of the fourth housing section 44. In the present embodiment, the thickness of the fourth housing section 44 is made greater than the thicknesses of the other housing sections 41 to 43. The first hinge 21 of the present embodiment is provided with a wing piece 211 which is fastened to the first housing section 41 by screws 9 and a wing piece 212 which is fastened to the fourth housing section 44 by screws 9. The leg parts 41L, 44L of the first and fourth housing sections 41, 44 are provided with recessed parts 410, 440. The recessed parts 410, 440 receive the wing pieces 211, 212 when the first and fourth housing sections 41, 44 rotate about the shaft 21A by 180 degrees and the leg parts 41L, 44L and extended parts 41E, 44E are superposed. The structure of the first hinge 21 is not limited to this embodiment.

Figure 14B:
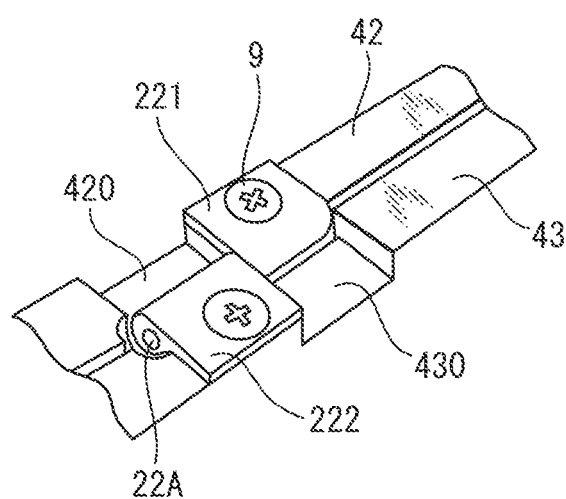
FIG. 14B is a perspective view which illustrates the structure of one embodiment of a second hinge which is illustrated in FIG. 12A.

FIG. 14B illustrates the structure of one embodiment of a second hinge 22 which is provided straddling the end face of the second housing section 42 and the end face of the third housing section 43. The second hinge 22 of the present embodiment is provided with a wing piece 221 which is fastened to the second housing section 42 by screws 9 and a wing piece 222 which is fastened to the third housing section 43 by screws 9. The end parts which are not fastened by screws 9 are arranged adjoining each other and are connected by a shaft 22A. The end faces of the second and third housing sections 42, 43 are provided with recessed parts 420, 430 which receive the wing pieces 221, 222 when the second and third housing sections 42, 43 are rotated about the shaft 22A by 180 degrees and the end faces are superposed. The structure of the second hinge 22 is not limited to this embodiment.

As explained above, the electronic device 40 which is provided with a connecting system of a multi-section housing of the present application can form a full flat large screen in the state with the four housing sections provided with screens connected together, even if different in thickness, and can be rendered a shape convenient for carrying by superposing the housing sections. Further, it is possible to make the housing section with the larger thickness the main housing section, mount the circuits and battery there, make the other housing sections thin sub-sections serving as only displays, and thereby make the overall thickness when folded up thinner.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A connecting system of a multi-section housing which is comprised of first to fourth four housing sections of rectangular shapes in a plan view which are superposed in that order, the thickness of at least one housing section being different from the thicknesses of the other housing sections, the connecting system of a multi-section housing comprising:

first connecting devices which are arranged between the first and second housing sections and between the third and fourth housing sections and which move the first and fourth housing sections in relation to the second and third housing sections from the superposed positions so that they are arranged at the sides of the second and third housing sections and each having at least one shaft; and second connecting devices including first hinges which connect single end faces of the superposed first and fourth housing sections and second hinges which connect end faces of the superposed second and third housing sections at the opposite sides as the first hinges; wherein the first and fourth housing sections are able to be arranged at the sides of the second and third housing sections while remaining the same in position in the thickness direction using the first connecting devices, and in the state that the first and fourth housing sections are adjoined to the second and third housing sections, end faces of the first and fourth housing sections at the non-connected sides are able to be opened about hinge shafts of the first hinges and end faces of the second and third housing sections at the non-connected sides are able to be opened about hinge shafts of the second hinges at the same time, and shafts which are built into the first connecting devices enable the second housing section to be rotated 180 degrees with respect to the first housing section and the fourth housing section to be rotated 180 degrees with respect to the third housing section also at the same time, and which make the positions of the first housing section and second housing section and the third housing section and the fourth housing section in the thickness direction the same to form a single flat surface.

2. The connecting system of a multi-section housing according to claim 1, wherein the first connecting devices are slide arms which are provided with lengths the same as the total lengths of the four housing sections in the slide direction and which also provide the functions of the shafts, the first and fourth housing sections are pulled out from superposed positions by the slide arms and are arranged adjoining the second and third housing sections while remaining the same in position in the thickness direction, and, in the state where the first and fourth housing sections and the second and third housing sections are arranged adjoining each other, the slide arms are attached between the first and second housing sections and between the third and fourth housing sections so that the lengths of the shafts which are exposed at the first and fourth housing section sides and the lengths of the shafts which are exposed at the second and third housing section sides become the same.

3. The connecting system of a multi-section housing according to claim 1, wherein the first connecting devices are slide arms with single end sides forming fixed parts which are fixed to the first and fourth housing sections and with other end sides forming slide-and-rotate parts which stick out from the first and fourth housing sections, make the first and fourth housing sections slide with respect to the second and third housing sections, then make them rotate with respect to the second and third housing sections and which also provide the functions of the shafts, the second and third housing sections have holding parts which hold the slide-and-rotate parts when the first to fourth housing sections are superposed, and the first and fourth housing sections are pulled out from superposed positions by the slide arms and are arranged adjoining the second and third housing sections while remaining the same in position in the thickness direction.

4. The connecting system of a multi-section housing according to claim 3, wherein the holding part at the second housing section is formed so as to become the same plane as the outside surface of the first housing section in the state where the first and second housing sections are superposed, and the holding part at the third housing section is formed so as to become the same plane as the outside surface of the fourth housing section in the state where the third and fourth housing sections are superposed.

5. The connecting system of a multi-section housing according to claim 3, wherein the end faces of the first and fourth housing sections at the sides far from the holding parts of the second and third housing sections are provided with leg parts of the same heights as the holding parts.

6. The connecting system of a multi-section housing according to claim 5, wherein the leg parts are provided with the same lengths as the holding parts in the slide direction of the first and fourth housing section.

7. The connecting system of a multi-section housing according to claim 2, wherein the superposed surface of the second housing section with the first housing section is provided with a groove which makes the slide arm slide and makes the slide arm rotate at the slide end position.

8. The connecting system of a multi-section housing according to claim 1, wherein the first connecting devices include first shafts which are provided at single end faces in the vertical direction with respect to the superposed surfaces of the first to fourth housing sections and second shafts which are provided in directions perpendicular to the first shafts, and centerlines of the first shafts are arranged on lines bisecting the end faces to the left and right, centerlines of the second shafts are arranged on superposed surfaces of the first and second housing sections and on superposed surfaces of the third and fourth housing sections, and the first and fourth housing sections are rotated from the superposed positions by the first shafts by 180 degrees and are arranged adjoining the second and third housing sections while remaining the same in position in the thickness direction.

9. A connecting system of a multi-section housing according to claim 1, wherein the first connecting devices include first shafts which are provided at single end faces in a vertical direction with respect to superposed surfaces of the first to fourth housing sections and second shafts which are provided at positions which are twisted with respect to the first shafts, and when the length of a normal descending from the first shafts to the second shafts is defined as X, the first and second housing sections are provided with first and fourth extended parts with end parts which are extended with respect to the first shafts to the outside by exactly the length 2X to the same side as the second shafts and the second and third housing sections are provided with second and third extended parts with end parts which are extended with respect to the first shafts to the outside by exactly the length 2X to the opposite side as the second shafts, the first hinges are attached between the first and fourth extended parts, centerlines of the first shafts are arranged on lines bisecting the end faces to the left and right, centerlines of the second shafts are arranged on superposed surfaces of the first and second housing sections, the first and fourth housing sections are rotated from superposed positions by the first shafts by 180 degrees and are arranged adjoining the second and third housing sections while remaining the same in position in the thickness direction, and in that state, the second shafts are positioned at the middle of the end faces where the first hinges are attached and the end faces where the second hinges are attached.

10. The connecting system of a multi-section housing according to claim 9, wherein the first and fourth extended parts are provided with leg parts which become the same plane as the superposed surfaces of the second and third housing section when the first to fourth housing sections are superposed, and the second and third extended parts are provided with leg parts which become the same plane as the exposed surfaces of the first and fourth housing sections when the first to fourth housing sections are superposed.

11. An electronic device which is provided with a multi-section housing which is comprised of first to fourth four housing sections of rectangular shapes in a plan view which are superposed in that order, the thickness of at least one housing section being different from the thicknesses of the other housing sections, comprising:

a connecting system of the multi-section housing which connects the first to fourth housing sections so as to form a single flat surface when the first to fourth housing sections are spread open; and a control device which is provided in any one of the first to fourth housing sections and which displays an image of one-quarter of a screen's worth of a single display image synchronized with other images, wherein the connecting system of the multi-section housing including:

first connecting devices which are arranged between the first and second housing sections and between the third and fourth housing sections and which move the first and fourth housing sections in relation to the second and third housing sections from the superposed positions so that they are arranged at the sides of the second and third housing sections and each having at least one shaft; and second connecting devices including first hinges which connect single end faces of the superposed first and fourth housing sections and second hinges which connect end faces of the superposed second and third housing sections at the opposite sides as the first hinges;

the first and fourth housing sections are able to be arranged at the sides of the second and third housing sections while remaining the same in position in the thickness direction using the first connecting devices, and in the state that the first and fourth housing sections are adjoined to the second and third housing sections, end faces of the first and fourth housing sections at the non-connected sides are able to be opened about hinge shafts of the first hinges and end faces of the second and third housing sections at the non-connected sides are able to be opened about hinge shafts of the second hinges at the same time, and shafts which are built into the first connecting devices enable the second housing section to be rotated 180 degrees with respect to the first housing section and the fourth housing section to be rotated 180 degrees with respect to the third housing section also at the same time, and which make the positions of the first housing section and second housing section and the third housing section and the fourth housing section in the thickness direction the same to form a single flat surface, and when the connecting system of a multi-section housing is used to make the first to fourth housing sections form a single flat surface, the control device is used to make adjoining display screens display a single image as a whole.

\* \* \* \* \*